US008818610B1

(12) United States Patent
Szybalski et al.

(10) Patent No.: US 8,818,610 B1
(45) Date of Patent: Aug. 26, 2014

(54) USER INTERFACE FOR DISPLAYING INTERNAL STATE OF AUTONOMOUS DRIVING SYSTEM

(71) Applicant: Google Inc., Mountain View, CA (US)

(72) Inventors: Andrew Szybalski, San Francisco, CA (US); Luis Ricardo Prada Gomez, Hayward, CA (US); Philip Nemec, San Jose, CA (US); Christopher Paul Urmson, Mountain View, CA (US); Sebastian Thrun, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 13/781,113

(22) Filed: Feb. 28, 2013

Related U.S. Application Data

(63) Continuation of application No. 13/682,920, filed on Nov. 21, 2012, which is a continuation of application No. 12/769,252, filed on Apr. 28, 2010, now Pat. No. 8,346,426.

(51) Int. Cl.
  *G05D 1/02* (2006.01)
  *B62D 6/00* (2006.01)
(52) U.S. Cl.
  USPC .................................. 701/28; 701/25; 701/41
(58) Field of Classification Search
  USPC ......... 701/1, 23–25, 27, 28, 41, 44, 408–410, 701/301, 302
  See application file for complete search history.

(56) References Cited

U.S. PATENT DOCUMENTS

| | | | |
|---|---|---|---|
| 5,521,579 A * | 5/1996 | Bernhard | 340/438 |
| 5,644,386 A | 7/1997 | Jenkins et al. | |
| 5,684,697 A | 11/1997 | Mullen | |
| 5,774,069 A | 6/1998 | Tanaka et al. | |
| 5,835,870 A | 11/1998 | Kagawa | |
| 5,838,562 A | 11/1998 | Gudat et al. | |
| 5,874,904 A | 2/1999 | Hirabayashi et al. | |
| 5,906,645 A | 5/1999 | Kagawa et al. | |
| 5,983,161 A | 11/1999 | Lemelson et al. | |
| 6,185,499 B1 | 2/2001 | Kinoshita et al. | |
| 6,275,773 B1 | 8/2001 | Lemelson et al. | |
| 6,324,463 B1 | 11/2001 | Patel | |
| 6,337,638 B1 | 1/2002 | Bates et al. | |
| 6,396,417 B2 * | 5/2002 | Lee | 340/904 |
| 6,487,500 B2 | 11/2002 | Lemelson et al. | |
| 6,516,262 B2 | 2/2003 | Takenaga et al. | |
| 6,590,499 B1 | 7/2003 | D'Agosto | |

(Continued)

OTHER PUBLICATIONS

Sebastian, et al., Stanley: The Robot That Won the DARPA Grand Challenge, Journal of Field Robotics 23(9), 661-692 (2006), 2006 Wiley Periodicals, Inc.

(Continued)

*Primary Examiner* — Drew Brown
(74) *Attorney, Agent, or Firm* — Lerner, David, Littenberg, Krumholz & Mentlik, LLP

(57) ABSTRACT

Autonomous vehicles use various computing systems to transport passengers from one location to another. A control computer sends messages to the various systems of the vehicle in order to maneuver the vehicle safely to the destination. The control computer may display information on an electronic display in order to allow the passenger to understand what actions the vehicle may be taking in the immediate future. Various icons and images may be used to provide this information to the passenger.

21 Claims, 21 Drawing Sheets

(56) References Cited

U.S. PATENT DOCUMENTS

| | | |
|---|---|---|
| 6,768,962 B2 | 7/2004 | Bullinger et al. |
| 6,810,330 B2 | 10/2004 | Matsuura |
| 6,868,934 B2 | 3/2005 | Dirrig |
| 7,209,221 B2 | 4/2007 | Breed et al. |
| 7,295,904 B2 | 11/2007 | Kanevsky et al. |
| 7,319,777 B2 | 1/2008 | Morcom |
| 7,321,311 B2 | 1/2008 | Rieth et al. |
| 7,327,238 B2 | 2/2008 | Bhogal et al. |
| 7,430,473 B2 | 9/2008 | Foo et al. |
| 7,446,649 B2 | 11/2008 | Bhogal et al. |
| 7,486,176 B2 | 2/2009 | Bhogal et al. |
| 7,486,177 B2 | 2/2009 | Wilbrink et al. |
| 7,630,806 B2 | 12/2009 | Breed |
| 7,769,498 B2 | 8/2010 | Isaji et al. |
| 7,783,403 B2 * | 8/2010 | Breed ............... 701/45 |
| 7,865,310 B2 | 1/2011 | Nakano et al. |
| 7,894,951 B2 | 2/2011 | Norris et al. |
| 7,925,438 B2 | 4/2011 | Lo |
| 7,979,172 B2 | 7/2011 | Breed |
| 7,979,173 B2 | 7/2011 | Breed |
| 8,050,863 B2 | 11/2011 | Trepagnier et al. |
| 8,126,642 B2 | 2/2012 | Trepagnier et al. |
| 8,204,670 B2 | 6/2012 | Watanabe |
| 8,269,652 B2 * | 9/2012 | Seder et al. ............ 340/903 |
| 8,320,628 B2 | 11/2012 | Cheng et al. |
| 8,352,110 B1 | 1/2013 | Szybalski et al. |
| 8,384,532 B2 * | 2/2013 | Szczerba et al. .......... 340/435 |
| 8,395,529 B2 * | 3/2013 | Seder et al. ............ 340/905 |
| 8,433,470 B1 | 4/2013 | Szybalski et al. |
| 8,482,431 B2 * | 7/2013 | Kushi et al. ............ 340/905 |
| 2005/0234612 A1 | 10/2005 | Bottomley et al. |
| 2006/0089765 A1 | 4/2006 | Pack et al. |
| 2008/0071177 A1 | 3/2008 | Yanagidaira et al. |
| 2008/0119994 A1 | 5/2008 | Kameyama |
| 2008/0306668 A1 | 12/2008 | Wang et al. |
| 2009/0147996 A1 | 6/2009 | Peng |
| 2009/0322547 A1 | 12/2009 | Wen |
| 2010/0063663 A1 | 3/2010 | Tolstedt et al. |
| 2010/0085173 A1 | 4/2010 | Yang et al. |
| 2010/0168998 A1 | 7/2010 | Matsunaga |
| 2010/0179715 A1 | 7/2010 | Puddy |
| 2010/0222976 A1 | 9/2010 | Haug |
| 2010/0228417 A1 | 9/2010 | Lee et al. |
| 2010/0332127 A1 * | 12/2010 | Imai et al. ............ 701/208 |
| 2011/0140919 A1 * | 6/2011 | Hara et al. ............ 340/907 |
| 2011/0193722 A1 | 8/2011 | Johnson |
| 2012/0035788 A1 | 2/2012 | Trepagnier et al. |
| 2012/0109418 A1 | 5/2012 | Lorber |
| 2012/0269391 A1 | 10/2012 | Saito |
| 2012/0283942 A1 * | 11/2012 | T'Siobbel et al. ......... 701/410 |
| 2012/0288156 A1 | 11/2012 | Kido |
| 2013/0129150 A1 | 5/2013 | Saito |

OTHER PUBLICATIONS

Sebastian Thrun, Toward Robotic Cars, Apr. 2010, pp. 99-106, No. 4, Communications of the ACM.

Bakambu et al., "Autonomous system for exploration and navigation in drift networks", 2004 IEEE Intelligent Vehicles Symposium, University of Parma, Parma, Italy, Jun. 14-17, pp. 212-217, 2004.

* cited by examiner

FIGURE 1    100

USER INTERFACE FOR DISPLAYING INTERNAL STATE OF AUTONOMOUS DRIVING SYSTEM

CROSS-REFERENCE TO RELATED APPLICATIONS

The present application is a continuation of U.S. patent application Ser. No. 13/682,920 filed Nov. 21, 2012, which is a continuation of U.S. patent application Ser. No. 12/769,252, filed Apr. 28, 2010, the entire disclosures of which are hereby incorporated herein by reference.

BACKGROUND OF THE INVENTION

1. Field of the Invention

The invention relates generally to user interface applications for autonomous driving systems. More specifically, user interfaces for displaying the status of the autonomous driving system are provided.

2. Description of Related Art

Autonomous vehicles use various computing systems to transport passengers from one location to another. Some autonomous vehicles may require some initial input from an operator, such as a pilot, driver, or passenger while other systems may require continuous input. Other systems, for example autopilot systems, may be used only when the system has been engaged, thus the operator may switch from a manual to an autonomous mode where the vehicle drives itself.

A key component of an autonomous vehicle is the perception system, which allows the vehicle to perceive and interpret its surroundings during a trip. When the autonomous system is engaged, the system will make various decisions during the trip, for example, speed up, slow down, stop, etc. The operator may be unaware of the calculations or "reasoning" behind why the autonomous vehicle is taking some particular action. In order to feel safe and confident, the operator may want to know what the vehicle is planning to do in the immediate future.

Navigation systems may include electronic displays which appear to zoom in or out according to a vehicle's speed of travel to enable to user to identify where the vehicle may be within the next few seconds. Some of these systems provide real-time traffic information received via radio or satellite signals. However, these systems do no provide for the display of the speed or actual location of other vehicles or obstacles.

BRIEF SUMMARY OF THE INVENTION

An aspect of the invention provides a vehicle. The vehicle includes a plurality of control apparatuses including a braking apparatus, an acceleration apparatus, and a steering apparatus; a user input device for inputting destination information; a geographic position component for determining the current location of the vehicle; an object detection apparatus for detecting and identifying a type of an object in or proximate to a roadway; memory for storing a detailed roadway map including roadways, traffic signals, and intersections; an electronic display for displaying information to a passenger; and a processor. The processor is programmed to receive the destination information; identify a route to the destination; determine, from location information received from the geographic position component and the stored map information, the current geographic location of the vehicle; identify an object and object type based on object information received from the object detection apparatus; determine an action to be taken including controlling at least one of the control apparatuses based on the identified object, the current geographic location of the vehicle, and the route; and select images to be displayed based on the action to be taken and the identified object.

In one example, the identified object is a second vehicle and the image to be displayed is an icon representing the second vehicle.

In one example, the processor is further programmed to display the selected objects on the electronic display.

In one example, the icon representing the second vehicle is selected based on the type of vehicle.

In one example, the processor is further programmed to display, on the display, an image indicting a portion of the route to be traveled by the vehicle in the next few seconds.

In one example, the identified object is a second vehicle and the action to be taken is maintaining a safe following distance behind the vehicle.

In one example, the identified object is a second vehicle and the action to be taken is avoiding a headroom zone in front of the second vehicle.

In one example, the action to be taken is waiting and the method further comprises displaying text indicating that the vehicle is waiting.

In one example, the processor is further programmed to determine a geographic area to be displayed such that a larger geographic area is displayed where the vehicle is moving faster, and a smaller geographic area is displayed where the vehicle is moving slower.

In one example, the processor is further programmed to determine a geographic area to be displayed such that a larger geographic area is displayed where the roadway is associated with a relatively high speed limit, and a smaller geographic area is displayed where the roadway is associated with a relatively low speed limit.

In one example, the action to be taken is to stop at an intersection and the selected images include an icon indicating where the vehicle will stop at the intersection.

In one example, the action to be taken is waiting and the method further comprises displaying an icon indicating that the vehicle is waiting.

In one example, the processor is further programmed to determine the geographic area to be displayed based on the action to be taken, where if the action to be taken is a turn, the geographic area includes a larger view in the direction opposite to the turn.

In one example, the identified object is a traffic signal and the selected images include an icon indicating a traffic signal, and wherein the processor is further programmed to display the icon on the display proximate to the location of the traffic signal.

In one example, the identified object is a traffic signal and the selected images include an icon indicating a traffic signal, and the selected images include an icon indicating a state of the traffic signal. The processor is also further programmed to determine the state of the traffic signal; determine the action to be taken based on the state of the traffic signal.

In one example, the action to be taken is changing to a different lane, and the selected images include an icon indicating a turn signal.

Another aspect of the invention provides a method for selecting images for display on an display apparatus of a vehicle. The method includes receiving destination information from a user input device; identifying a route to the destination; receiving location information from a geographic position component; accessing stored map information including roadways, traffic signals, and intersections; determining, from the location information and the stored map information, the current geographic location of the vehicle; identifying an object of a roadway and an object type based on object information received from an object detection apparatus; determining an action to be taken including controlling at least one of a plurality of control apparatuses including a braking apparatus, an acceleration apparatus, and a steering apparatus, wherein the action to be taken is determined based on the identified object, the current geographic location of the vehicle, and the route; and selecting images to be displayed on the display apparatus based on the action to be taken and the identified object.

In one example, the method further includes displaying the selected images on the display apparatus.

In one example, the method further includes determining a geographic area to be displayed such that a larger geographic area is displayed where the vehicle is moving faster, and a smaller geographic area is displayed where the vehicle is moving slower.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
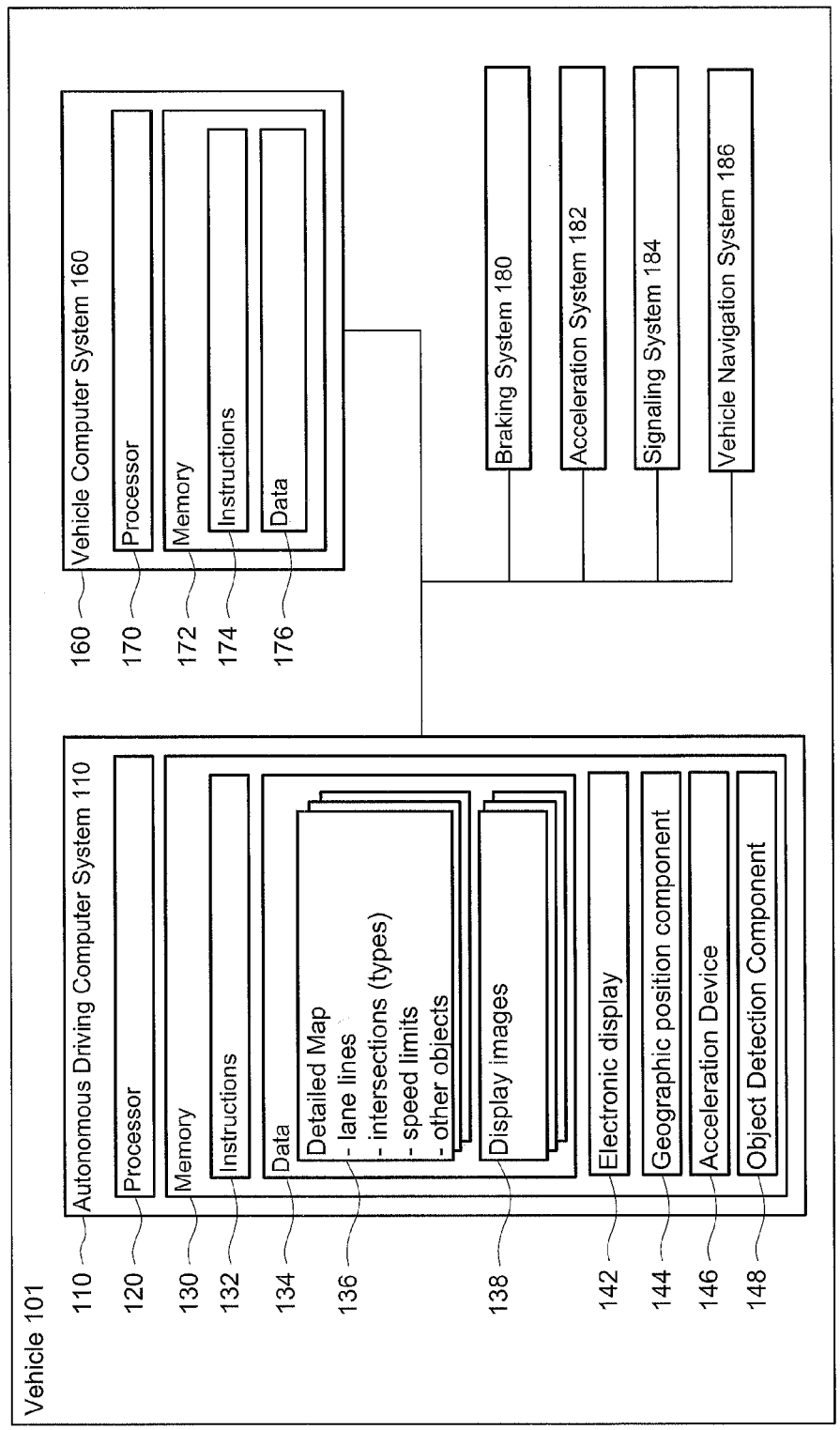
FIG. 1 is a functional diagram of a system in accordance with an aspect of the invention.

As shown in FIG. 1, an autonomous driving system 100 in accordance with one aspect of the invention includes a vehicle 101 with various components. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), and user input (e.g., a mouse, keyboard, touch-screen and/or microphone).

Computer 110 may also include a geographic position component 144 to determine the geographic location of the device. For example, computer 110 may include a GPS receiver to determine the device's latitude, longitude and/or altitude position. Other location systems such as laser-based localization systems, inertial-aided GPS, or camera-based localization may also be used.

Computer 110 may also include other features, such as an accelerometer, gyroscope or other acceleration device 146 to determine the direction in which the device is oriented. By way of example only, the acceleration device may determine its pitch, yaw or roll (or changes thereto) relative to the direction of gravity or a plane perpendicular thereto. In that regard, it will be understood that a computer's provision of location and orientation data as set forth herein may be provided automatically to the user, other computers of the network, or both.

Computer 110 may also include an object detection component 148 to detect and identify the location and movement (e.g. relative speed) of objects such as other vehicles, obstacles in the roadway, traffic signals, signs, etc. The detection system may include lasers, sonar, radar, cameras or any other such detection methods. For example, the object detector may include an imaging device to identify the state of a particular traffic signal as yellow or another color. In use, computer 110 may use this information to instruct the braking system of the vehicle to apply the brakes.

Data 134 may include various types of information used by computer 110. Detailed map information 136 may include maps identifying lane lines, intersections, speed limits, traffic signals, buildings, signs, or other such information. For example, computer 110 may access detailed map information 136 in order to determine where the lane lines should be located on a particular highway and adjust the speed or direction of vehicle 101 accordingly. Computer 110 may also access display images 138, such as roadways, intersections, and other objects in order to provide a passenger of vehicle 101 with an understanding of what actions vehicle 101 will take in the immediate future.

In one example, computer 110 may be an autonomous driving computing system capable of communicating with a vehicle's internal computer such as computer 160. Computer 160 may be configured similarly to computer 110, for example, including a processor 170, memory 172, instructions 174, and data 176. Computer 110 may send and receive information from the various systems of vehicle 101, for example the breaking 180, acceleration 182, signaling 184, and navigation 186 systems in order to control the movement, speed, etc. of vehicle 101. It will be understood that although various systems and computers 110 and 160 are shown within vehicle 101, these elements may be external to vehicle 101 or physically separated by large distances.

Figure 2:
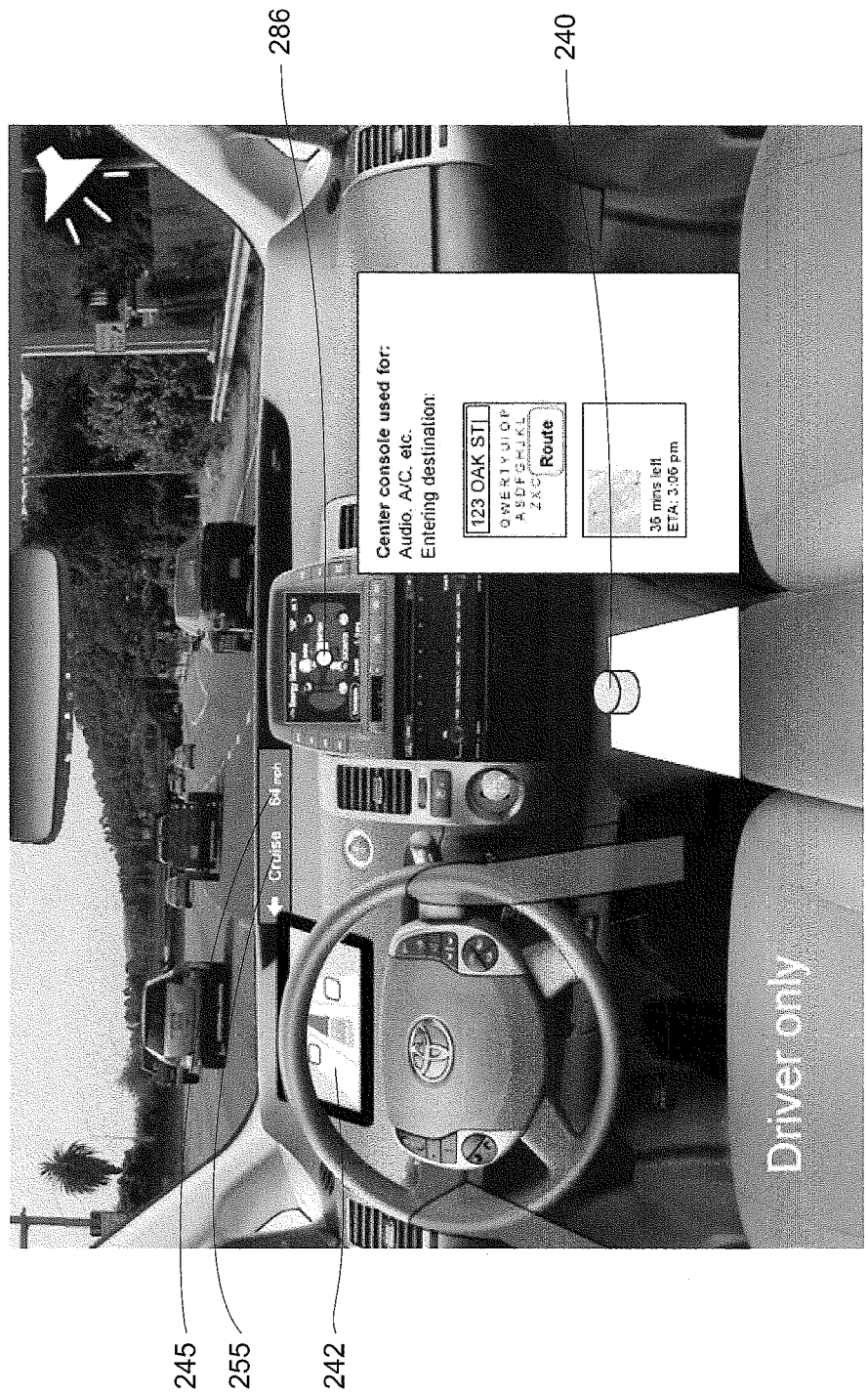
FIG. 2 is an exemplary design of the interior of an autonomous vehicle in accordance with an aspect of the invention.

FIG. 2 depicts an exemplary design of the interior of an autonomous vehicle. Vehicle 101 may display information to a passenger in a number of ways. For example, vehicle 101 may be equipped with a display 242 for the autonomous driving system and an indicator 255 which identifies whether the autonomous driving system has been engaged. Vehicle 101 may also identify the current speed of travel 245 by displaying the information in a location visible to the passenger or identifying the speed audibly. Further, as shown in the figure, vehicle 101 may also include a second display 286 for a navigation or entertainment system.

Vehicle 101 may include one or more user input devices, such as device 240, for inputting information into the autonomous driving computer 110. For example, a user may input a destination, (e.g. 123 Oak Street), into the navigation system. The navigation system may generate a route between the present location of the vehicle and the destination. If the autonomous driving system is engaged, computer 110 may request or automatically receive the route information from the navigation system. Once a route has been determined, the autonomous driving system may drive the vehicle to the destination.

Figure 3:
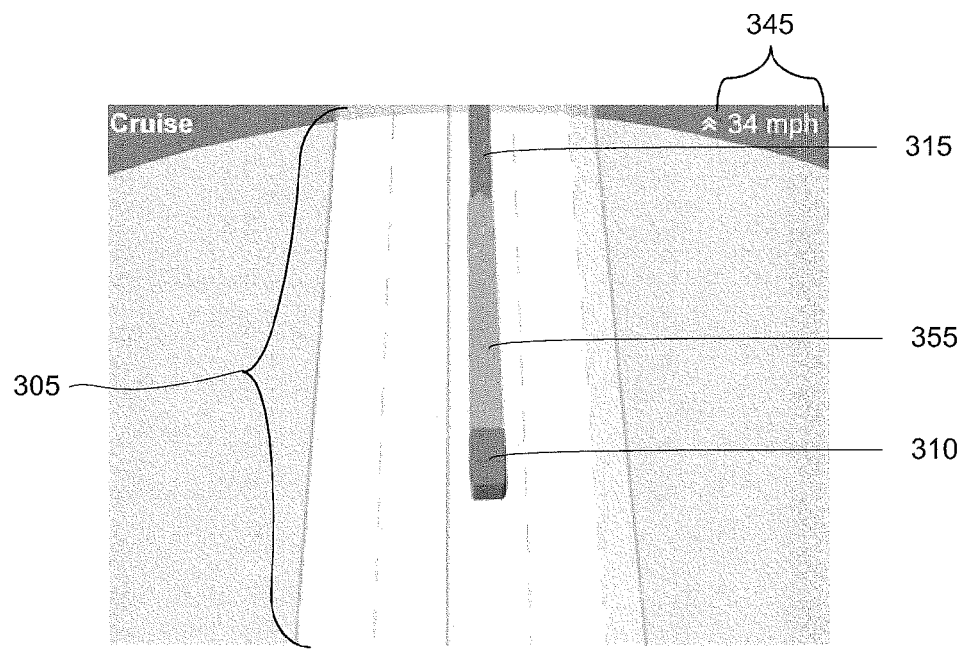
FIG. 3 is an exemplary screen shot in accordance with an aspect of the invention.

FIG. 3 is an exemplary screen shot of the display 242 of computer 110. The display may be used to identify to the passenger of the vehicle the current speed, location, orientation, etc. of vehicle 101 with respect to a relevant stretch of roadway 305. For example, vehicle 101 is depicted as an icon or box 310 on the screen. It will be understood that any relevant object may be used to identify the vehicle to the user.

The route along which the vehicle is traveling may be identified by a line extending from the vehicle. In the example of FIG. 3, the vehicle is moving forward, so route line 315 extends from the front of the vehicle. The display may also identify the speed indicator 345 of the device as well as the approximate path of the vehicle during the next few seconds, shown as path 355.

Figure 4:
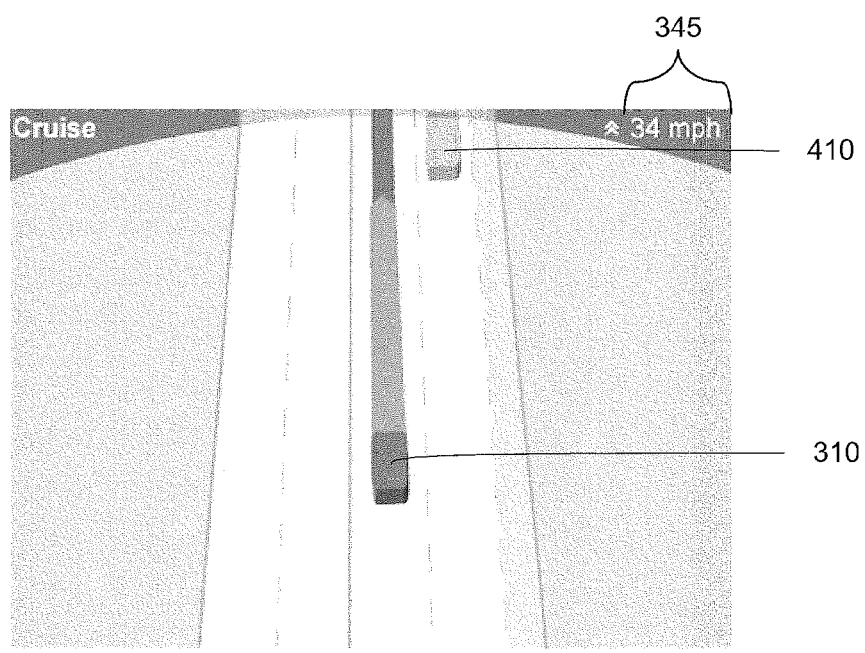
FIG. 4 is an exemplary screen shot in accordance with an aspect of the invention.

As shown in FIG. 4, the display may also identify other relevant objects. For example, where computer 110 has identified another vehicle on the roadway, the computer may display the vehicle as another icon, such as box 410, on the display in the approximate location of the roadway. The shape and size of the icon displayed may be selected by computer 110 based on the shape and size of actual vehicle, i.e. a compact vehicle may appear smaller than a tractor-trailer.

Figure 5:
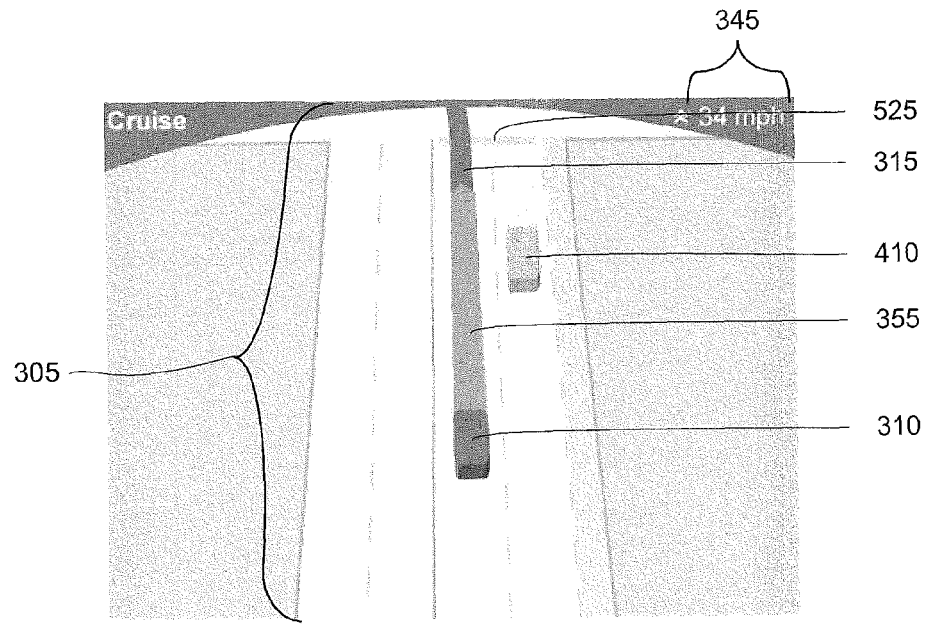
FIG. 5 is an exemplary screen shot in accordance with an aspect of the invention.

As vehicle 101 moves along the roadway, the location of objects detected by the vehicle, and the features of the roadway may change. These changes may be displayed in order to allow the user to understand that vehicle 101 is continuously monitoring the state of the vehicles, roadway and other objects. For example, as shown in FIG. 4, vehicle box 310 is driving along the roadway approaching a second vehicle identified as box 410. Some time later, vehicle 101 moves closer to the second vehicle, and as shown in FIG. 5, the distance between vehicle box 310 and box 410 has decreased. In addition, bar 525 may indicate that both vehicles are approaching an intersection.

As vehicle box 310 approaches an intersection, computer 110 may provide the user with additional information. For example, display may now include a representation of a cross-roadway 605 as well as additional vehicles, depicted as boxes 620 and 630. In addition, as computer identifies vehicles on roadway 305, these new vehicles may also be displayed as boxes, such as box 610.

Figure 6:
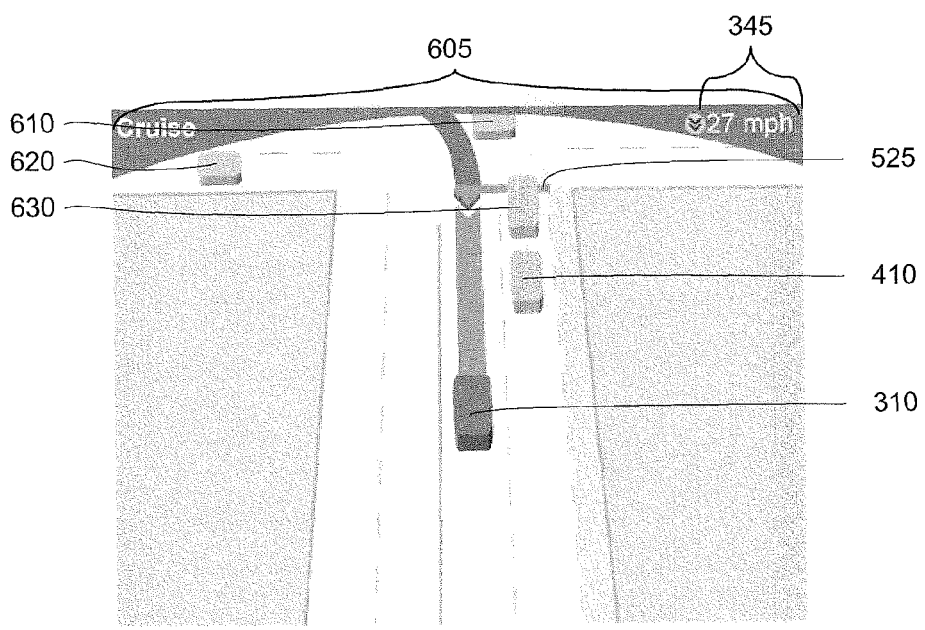
FIG. 6 is an exemplary screen shot in accordance with an aspect of the invention.

Computer 110 may also decrease the speed of vehicle 101 as it approaches the intersection, thus, the current speed of vehicle 101 may be continuously updated. For example, as shown in FIGS. 4 and 5, vehicle 101 is moving at 34 miles per hour, as indicated by speed indicator 345. As shown in FIG. 6, vehicle 101 is much closer to the intersection, thus computer 110 may slow vehicle 101's speed, thus speed indicator 345 now displays a speed of 27 miles per hour.

Figure 7:
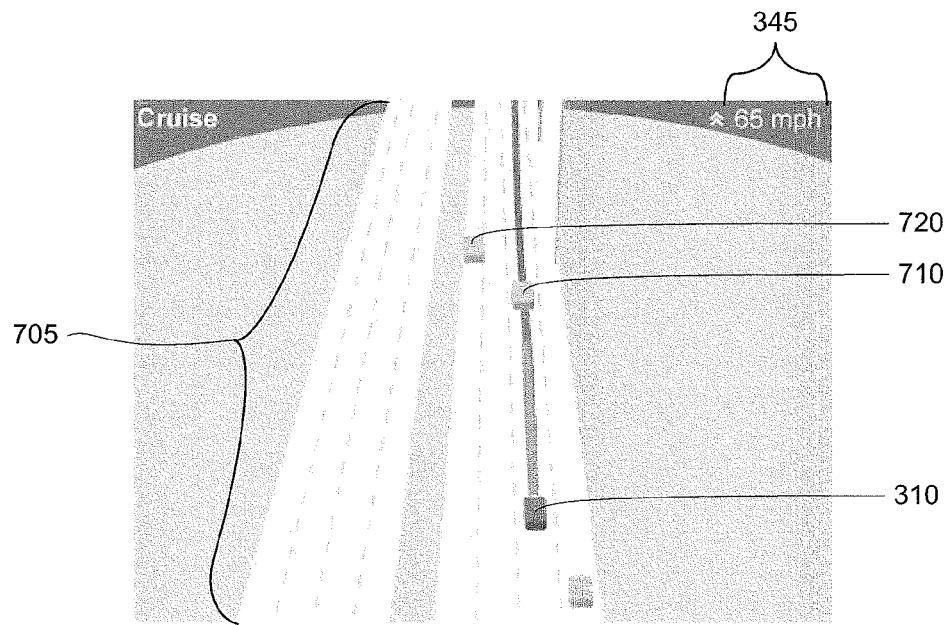
FIG. 7 is an exemplary screen shot in accordance with an aspect of the invention.

Computer 110 may also pan and zoom the display based on the type of roadway, speed limit of the roadway, and/or speed of the vehicle. For example, as shown in FIG. 7, vehicle 101, displayed as box 310, is moving along roadway 705 at 65 miles per hour. Thus, computer 110 displays a relatively large stretch of roadway 705. Returning to FIG. 4, vehicle 101 is moving at only 34 miles per hour, thus, computer 110 may display less of roadway 305. Similarly, the display may pan and zoom based on the speed limit of the roadway. In another example, if vehicle 101 is moving along a highway with cross traffic, display may zoom out more than if vehicle 101 is stopped at an "four-way" stop intersection, as the passenger may only need to see the intersection some relatively short distance around the intersection. In another example, if vehicle 101 is making an unprotected left-hand turn, the display may zoom out to a relatively large distance so that the passenger may see information from all directions.

Figure 8:
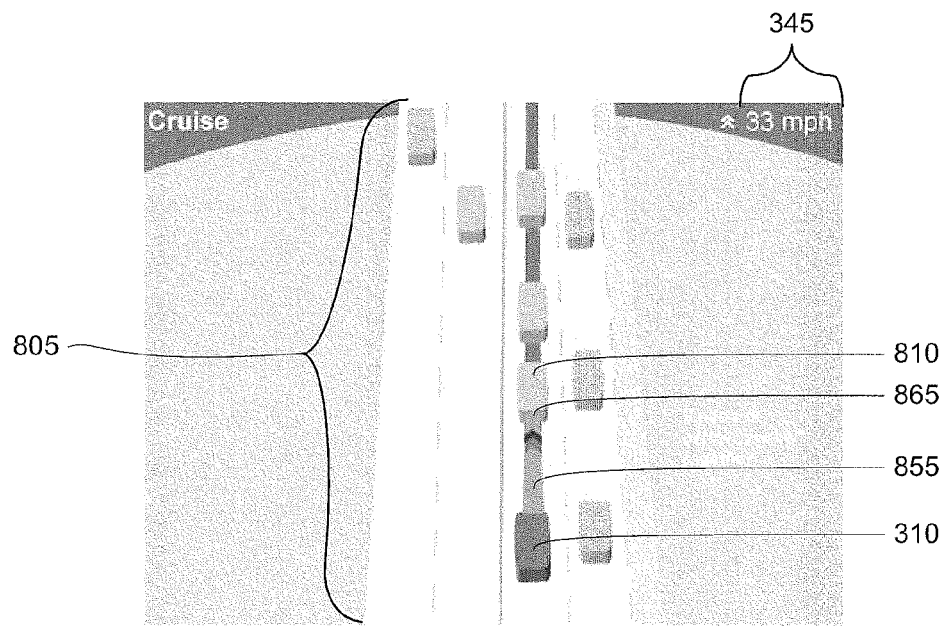
FIG. 8 is an exemplary screen shot in accordance with an aspect of the invention.
Figure 9:
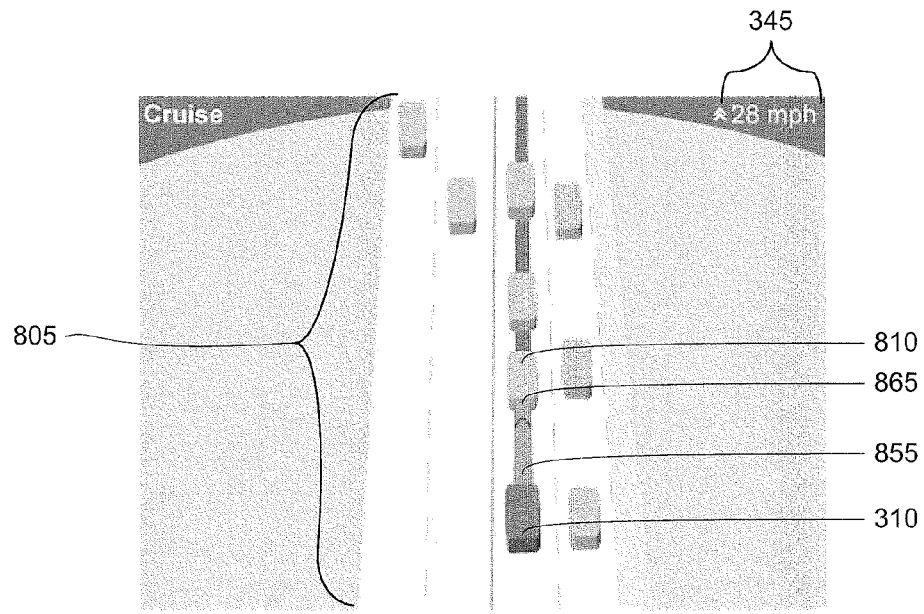
FIG. 9 is an exemplary screen shot in accordance with an aspect of the invention.

As vehicle 101 approaches other vehicles, computer 110 may maintain a safe following distance and display this information to the passenger. As show in FIG. 8, box 310 is moving along roadway 805 at 33 miles per hour. As box 310 approaches box 810, path 855 may shorten in order to indicate this information to the passenger. Box 810 may include a tail 865. The path 855 and tail 865 may be displayed as complementary shapes, for example as two arrow portions which may be fit together. In FIG. 9, box 310 has moved closer to box 810, and path 855 and tail 865 are displayed together. The closing of these two shapes may indicate that box 310 has reached a safe following distance behind box 810. The safe following distance may change based on the speed of vehicle 101, a vehicle in front of 101, and/or the speed limit of the roadway.

Figure 10:
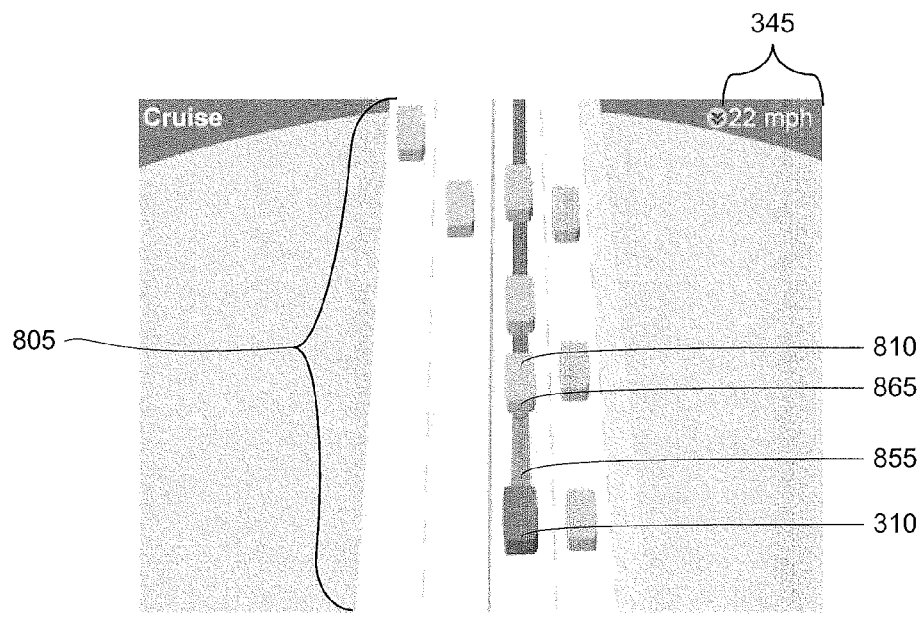
FIG. 10 is an exemplary screen shot in accordance with an aspect of the invention.

If the vehicle represented by box 810 slows down, computer 110 may determine that vehicle 101 is no longer following at a safe distance. Computer 110 may determine that vehicle 101 must slow down in order to correct the distance and display this information to the passenger. For example, FIG. 10, the shapes of path 855 and tail 865 have changed direction, which may indicate that vehicle 101 is not located a safe distance behind the next vehicle or box 810. Thus, computer 110 may reduce the speed of vehicle 101 and indicate this change to the user. For example, in FIG. 9, vehicle 101 is moving at 28 miles per hour, while in FIG. 10, vehicle 101 is moving at 22 miles per hour. In addition, as shown in FIG. 9, computer 110 may display an icon, such as double arrows, with speed indicator 345. In the example, the icon is double arrows directed upwards. In FIG. 10, as computer 101 has reduced the speed of vehicle 101, the icon displayed may be changed, and, for example, the arrows may be directed downwards.

Figure 11:
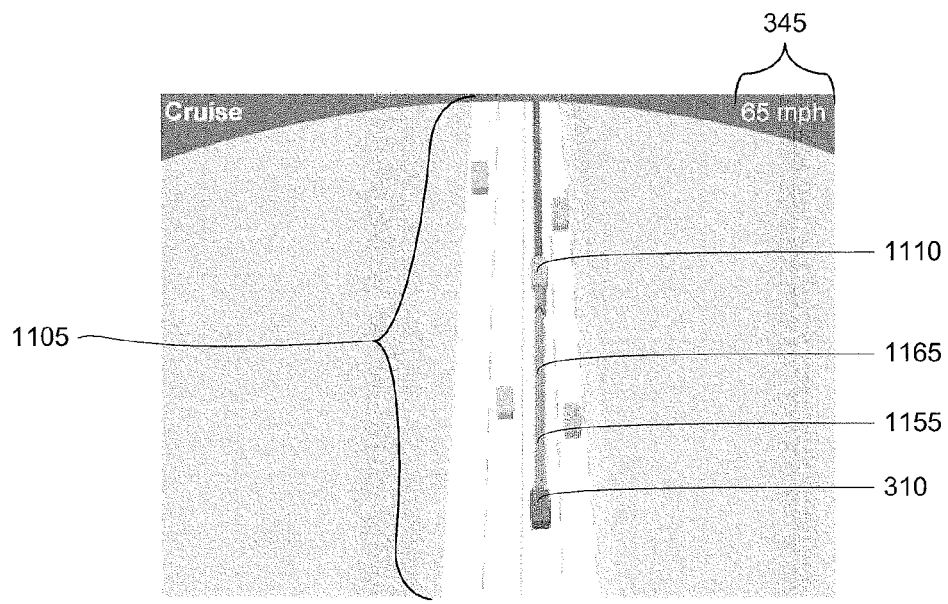
FIG. 11 is an exemplary screen shot in accordance with an aspect of the invention.

Computer 110 may determine the safe following distance based on the speed of vehicle 101, and may display the distance and zoom level accordingly. For example, as shown in FIGS. 10 and 11, where the vehicle 110, shown as box 310, is moving at 22 miles per hour, the safe following distance, 855 and 865, is much less than the safe following distance, 1155 and 1165, where the vehicle is moving at 65 miles per hour. Thus, comparing FIGS. 10 and 11, where the vehicle is moving at a slower speed, computer 110 may display a smaller area and length of roadway, whereas, if the vehicle is moving faster, a greater area and length of roadway may be displayed. In another example, the safe following distance may be based on the speed limit of the roadway.

Figure 12:
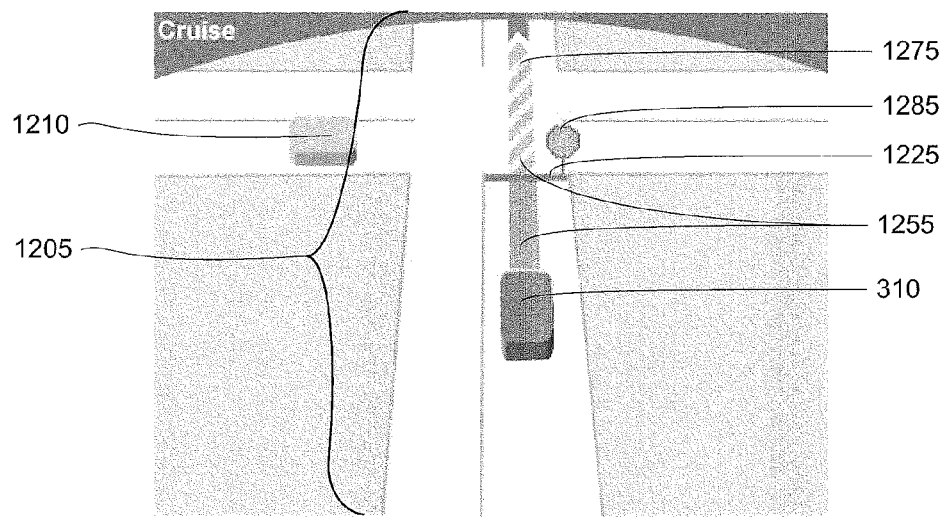
FIG. 12 is an exemplary screen shot in accordance with an aspect of the invention.

Computer 110 may also display information about intersections to the passenger. For example, as shown in FIG. 12, box 310 is approaching an intersection with a stop sign. For example, as discussed above, bar 1225 may indicate an intersection, and computer 110 may display an icon, such as stop sign 1285 along roadway 1205 to indicate that vehicle 101 is approaching a stop. Path 1255 includes a section 1275 past bar 1225 which may indicate that when vehicle 101 reaches the location of bar 1225, computer 110 may stop vehicle 101 for some period of time. For example, section 1275 may be displayed differently from the remainder of path 1255, such as stationary or moving stripes. Computer 110 may also identify and display other vehicles on the roadway, for example box 1210.

Figure 13:
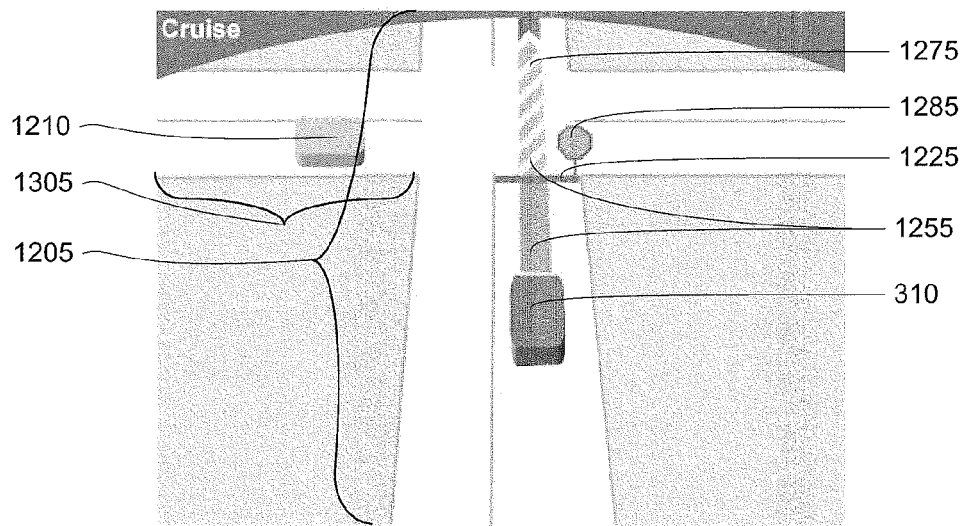
FIG. 13 is an exemplary screen shot in accordance with an aspect of the invention.
Figure 14:
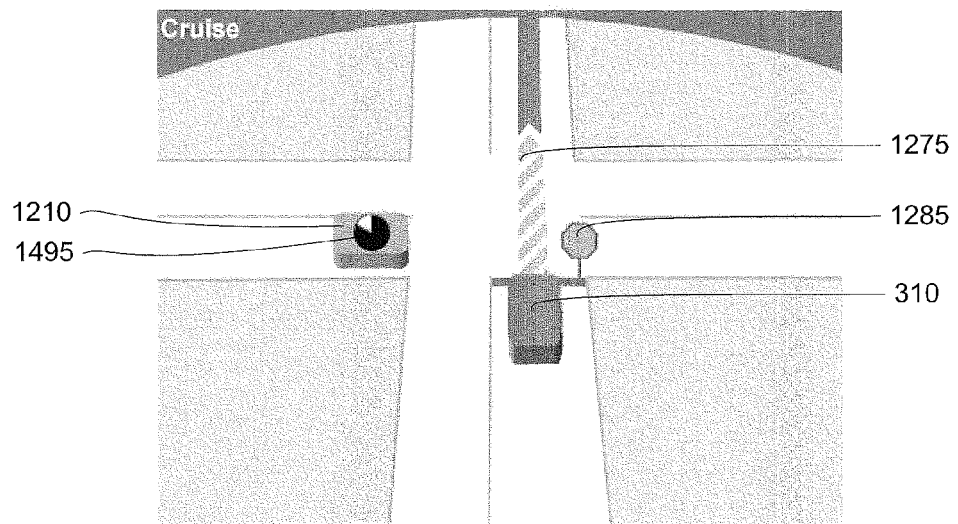
FIG. 14 is an exemplary screen shot in accordance with an aspect of the invention.
Figure 15:
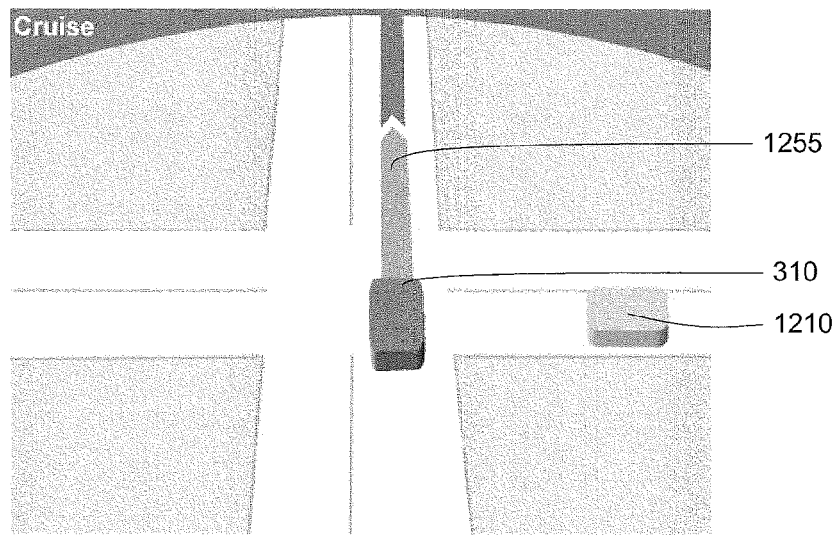
FIG. 15 is an exemplary screen shot in accordance with an aspect of the invention.

As shown in FIG. 13, when vehicle 101 reaches the location of bar 1225, vehicle 101 may come to a stop to wait until it is safe to cross the intersection, as indicated by the striped path 1275. In the example, box 1210 is moving along roadway 1305 and is near the intersection. In FIG. 14, both boxes 310 and 1210 are displayed at the intersection. In one example, computer 110 may display an icon, such as a ticking clock, indicating that box 1210 has the right of way, and computer 110 will wait for box 1210 to take some action. Computer 110 may also wait for a specified period of time, and if box 1210 has not yet moved, the computer may determine that box 1210 is waiting for vehicle 110 and move vehicle 110 as required by the route. As shown in FIG. 15, box 1210 has moved through the intersection. As the intersection is now clear, vehicle 101 moves through the intersection and box 310 is shown moving through the intersection as well. Path 1255 is displayed as a solid bar, which may indicate that computer 110 is no longer stopped or waiting.

Figure 16:
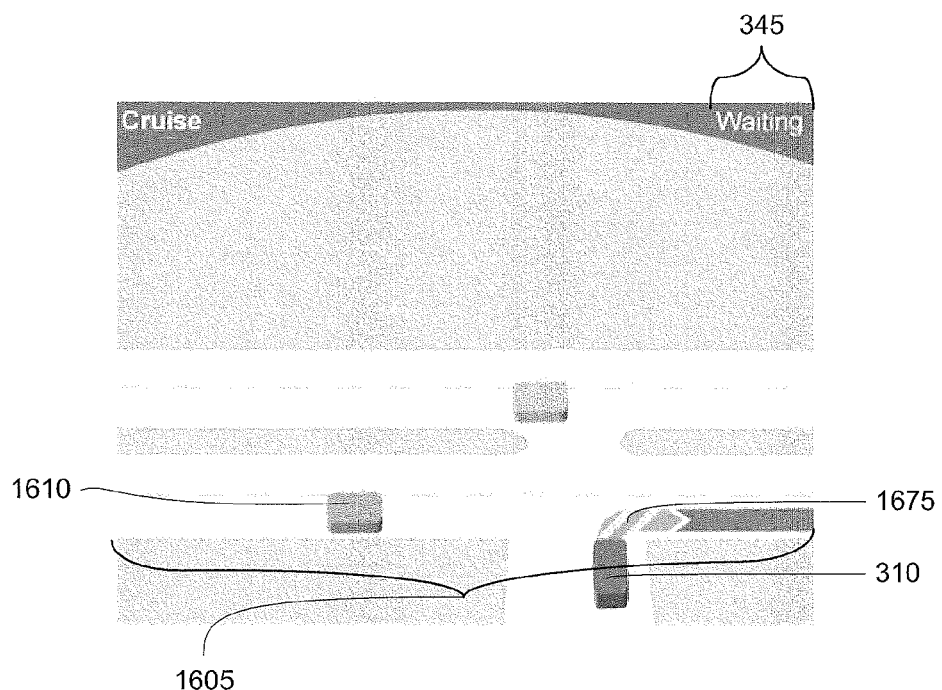
FIG. 16 is an exemplary screen shot in accordance with an aspect of the invention.
Figure 17:
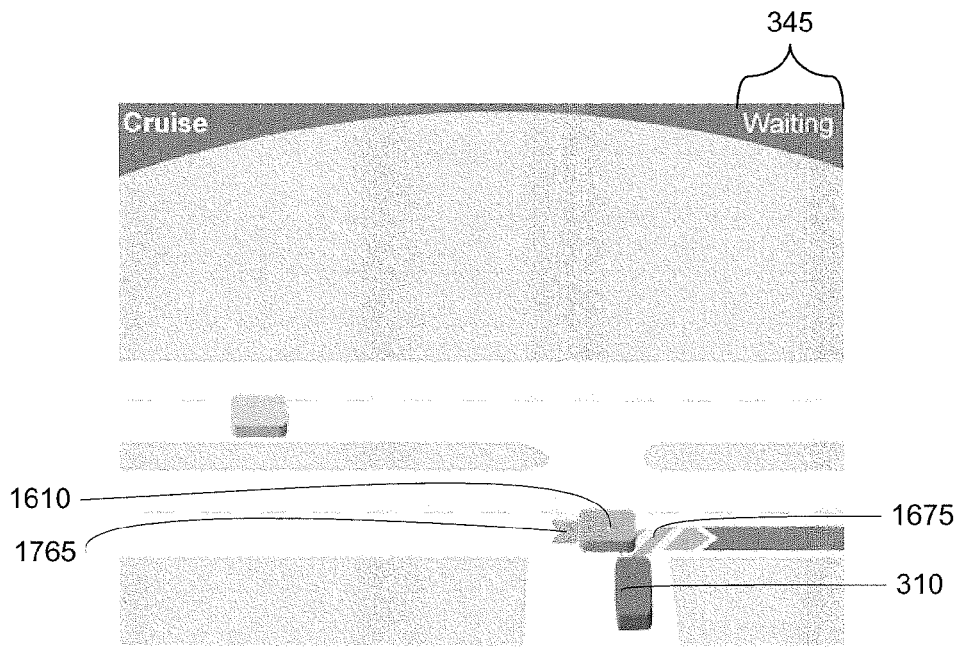
FIG. 17 is an exemplary screen shot in accordance with an aspect of the invention.
Figure 18:
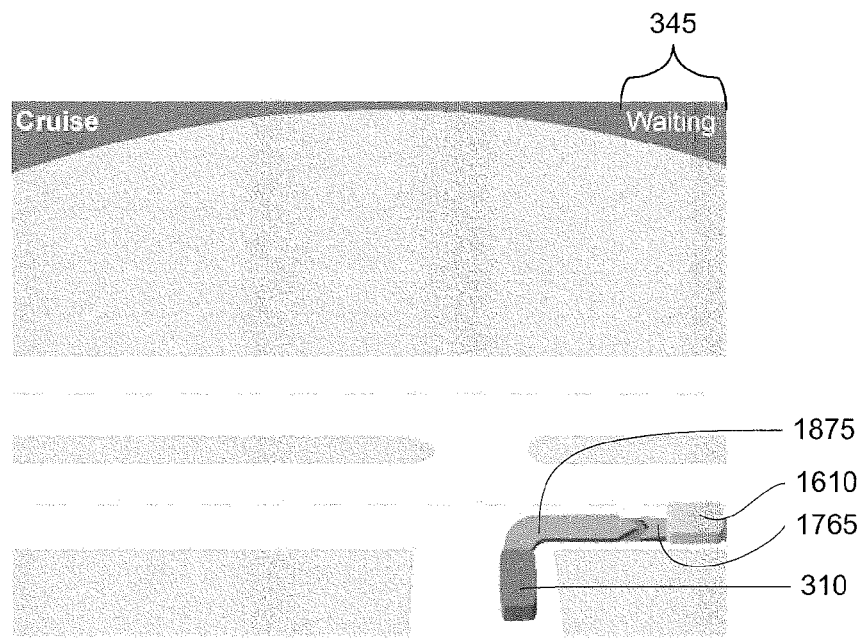
FIG. 18 is an exemplary screen shot in accordance with an aspect of the invention.

In the example of FIG. 16, box 310 is waiting at an intersection to make a right turn. Speed 345 may display information indicating that the computer is waiting, such as the text "waiting." As described above, computer 110 has panned the display to the right vehicles, such as box 1610 moving along roadway 1605 and to the right of box 310 are more important to the passenger than objects moving along roadway 1607 to the right of box 310. Path 1675 may also indicate that vehicle 101 is waiting for the intersection to be safe for a right turn. As shown in FIG. 17, as box 1610 approaches box 310, computer 110 may display a tail 1765 which complements the shape of path 1675. Once box 1610 has passed box 310, as shown in FIG. 18, path 1875 may be displayed as solid to indicate that vehicle 101 is ready to make the right turn. As described above, when vehicle 101 makes the turn, path 1875 and tail 1765 may come together, and computer 110 may maintain a safe following distance behind box 1610.

Figure 19:
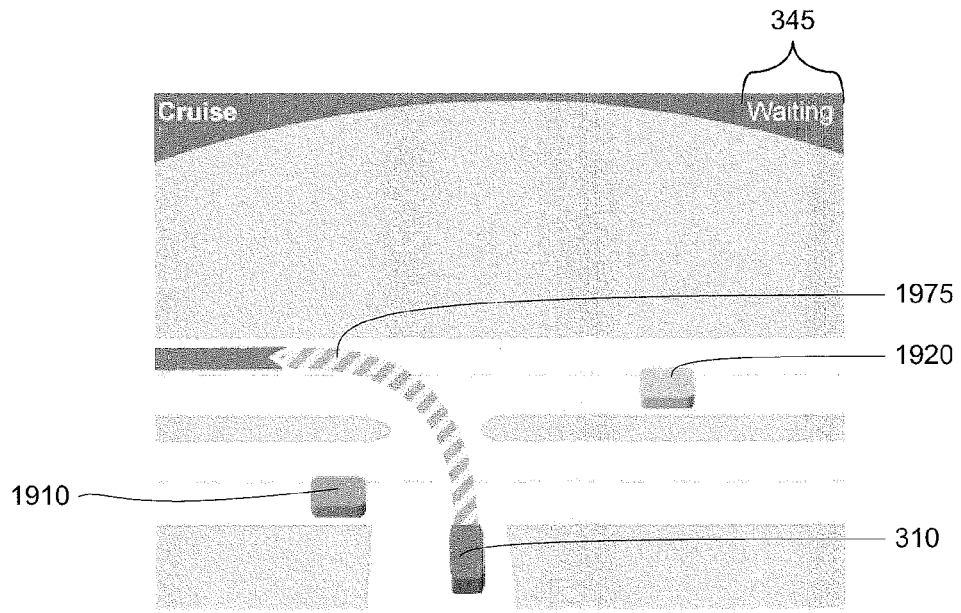
FIG. 19 is an exemplary screen shot in accordance with an aspect of the invention.
Figure 20:
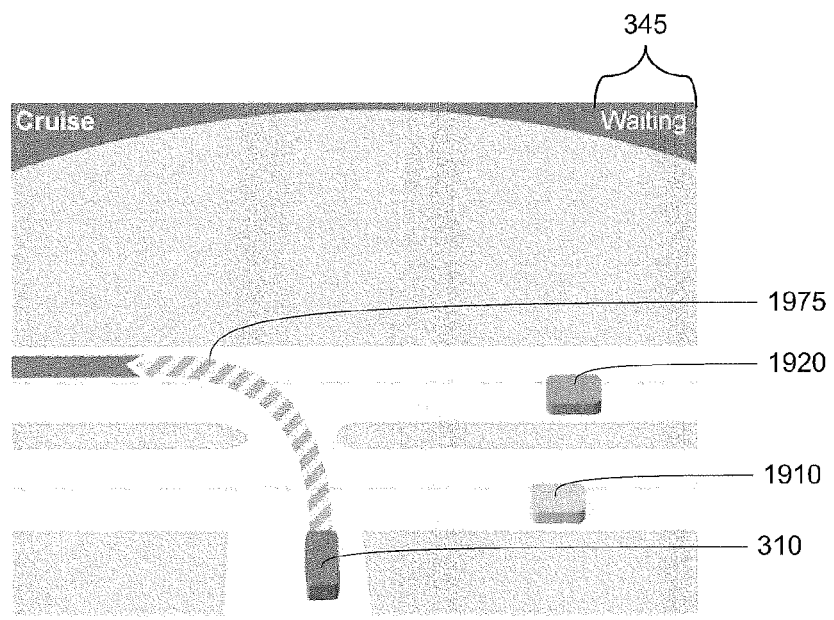
FIG. 20 is an exemplary screen shot in accordance with an aspect of the invention.
Figure 21:
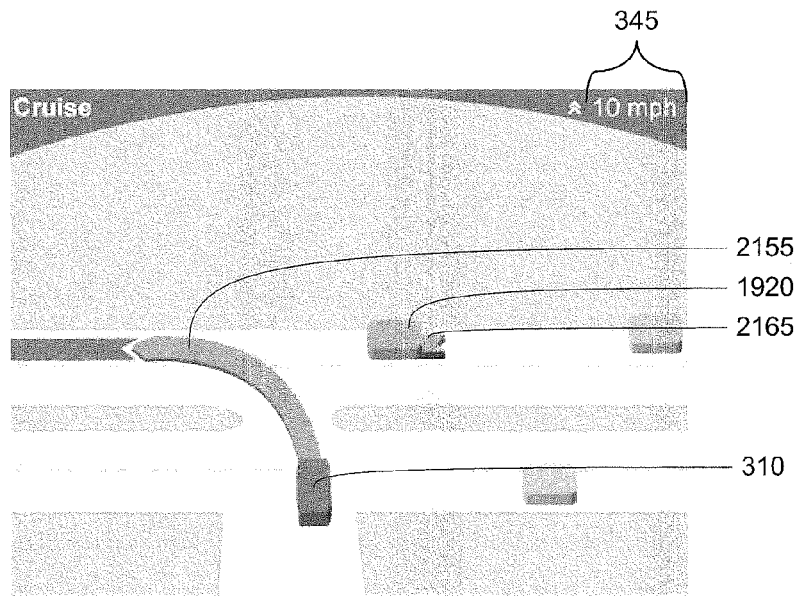
FIG. 21 is an exemplary screen shot in accordance with an aspect of the invention.
Figure 22:
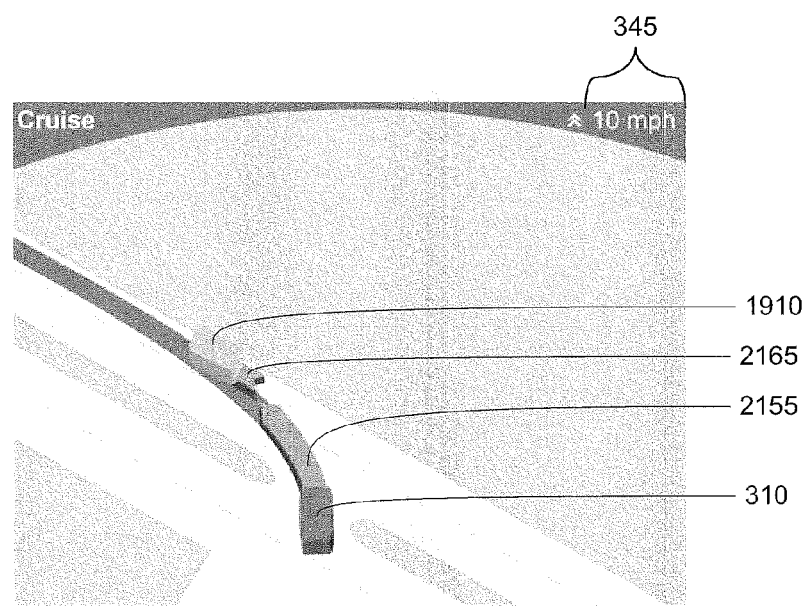
FIG. 22 is an exemplary screen shot in accordance with an aspect of the invention.
Figure 23:
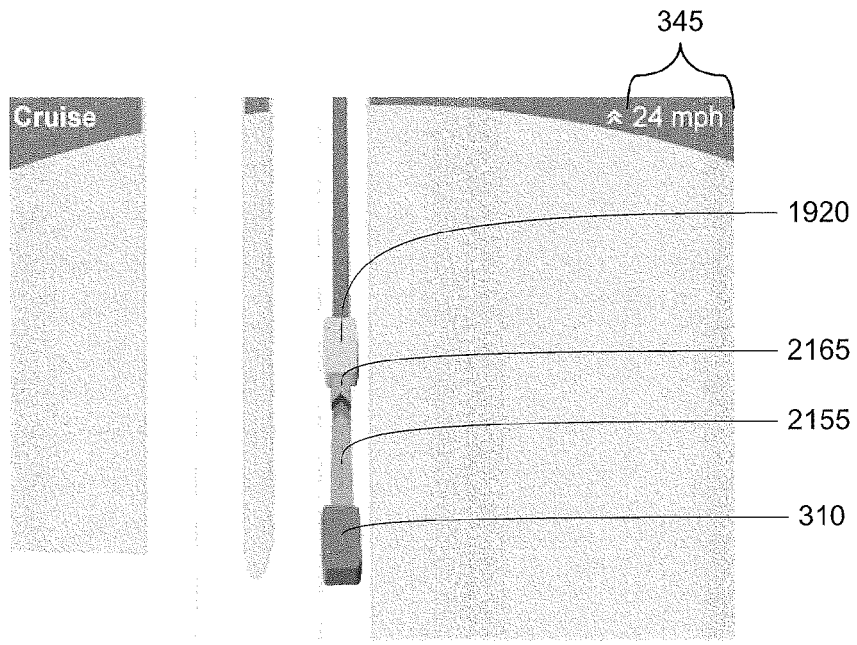
FIG. 23 is an exemplary screen shot in accordance with an aspect of the invention.
Figure 24:
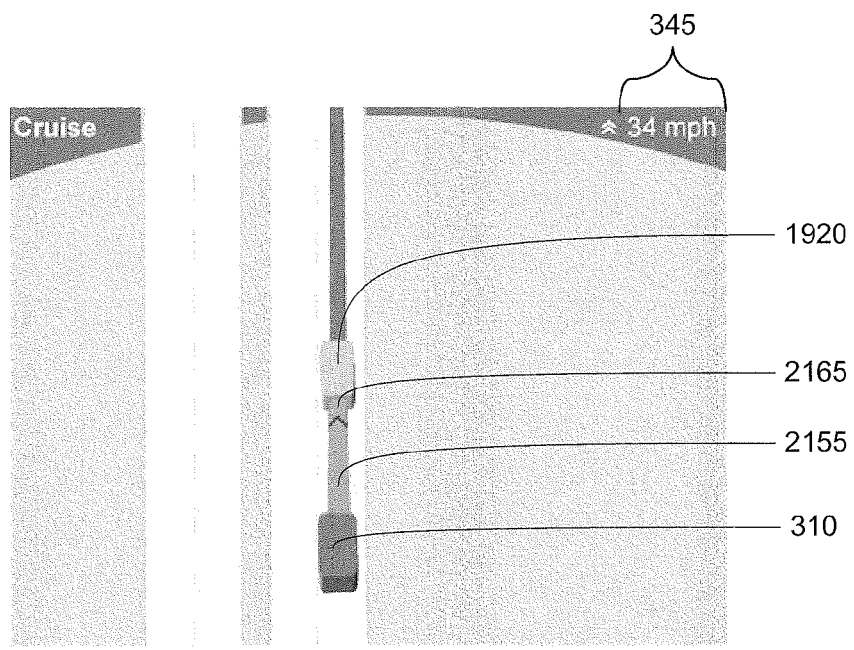
FIG. 24 is an exemplary screen shot in accordance with an aspect of the invention.

FIG. 19 depicts a more complicated left hand turn across several lanes of traffic. Similar to the example of FIGS. 16-18, computer 110 may wait to turn until the intersection is safe. Computer 110 may wait until both boxes 1910 and 1920 have cleared path 1975. As shown in FIG. 20, box 1910 has moved past path 1975, however box 1920 has not, thus computer 110 may continue to display the "waiting" text and the path 1975 as striped. As box 1920 approaches path 1975, computer may determine that it is safe to begin turning. Thus, as shown in FIG. 21, path 1975 now path 2155 is displayed as solid and box 1920 includes a tail 2165. Speed 345 may no longer display the waiting text and indicate that vehicle 101 is moving, for example at a speed of 10 miles per hour. As vehicle 101 makes the left turn, as shown in FIG. 22, display may move to the left to indicate the change in direction. Box 310 may approach tail 2165 of box 1920, and as shown in FIGS. 23 and 24, the complementary shapes may close together as vehicle 101 reaches a safe following distance, and the display may continue to shift the location of the roadway.

Figure 25:
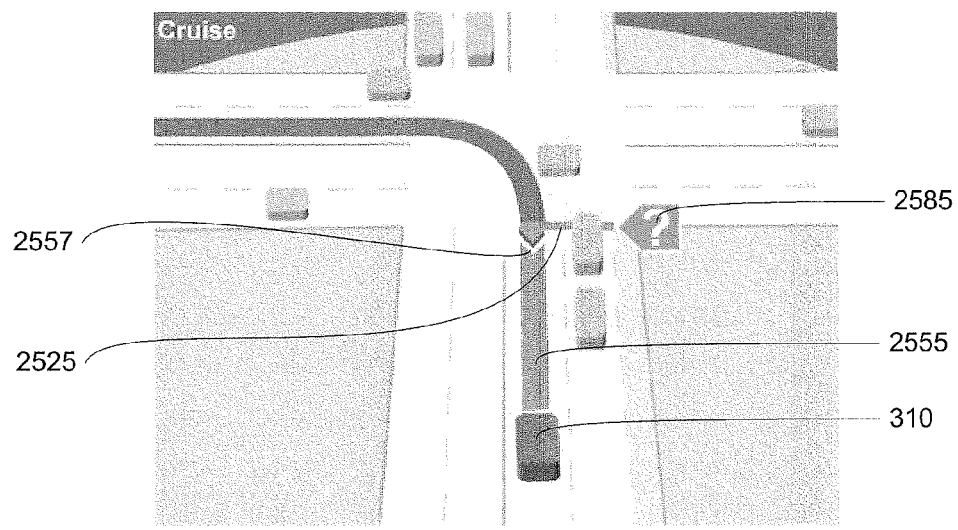
FIG. 25 is an exemplary screen shot in accordance with an aspect of the invention.
Figure 26:
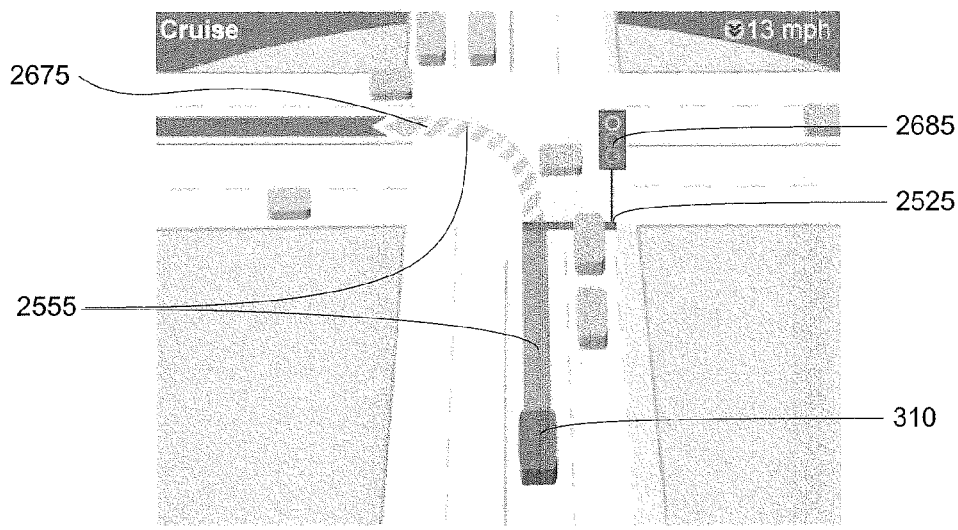
FIG. 26 is an exemplary screen shot in accordance with an aspect of the invention.

Computer 110 may also identify, recognize, and display the state of traffic signals. As shown in FIG. 25, vehicle 101 is approaching an intersection and computer 110 is planning to make a left turn. An inverted arrow icon 2557, may be displayed to indicate that computer 110 is or will cause vehicle 101 to slow down based on the intersection ahead. Computer 110 may determine, based on the detailed map that the intersection includes a number of traffic signals. In FIG. 25, computer may have identified a traffic signal but may not have determined the current state of the traffic signal. Computer 110 may indicate this information to the passenger by displaying an icon such as icon 2585. It will be understood that the polygon and question mark icon are only exemplary and any such indicator may be used. As shown in FIG. 26, computer 110 has determined the state of the traffic signal, and may indicate the state at icon 2685. For example, if computer 110 has determined that the traffic signal is red or yellow, path 2555 may include a striped section 2675 past bar 2525. Striped section 2675 which indicates that computer 110 may stop vehicle 310 at bar 2525 and wait at the intersection until it is safe to make the left turn.

Figure 27:
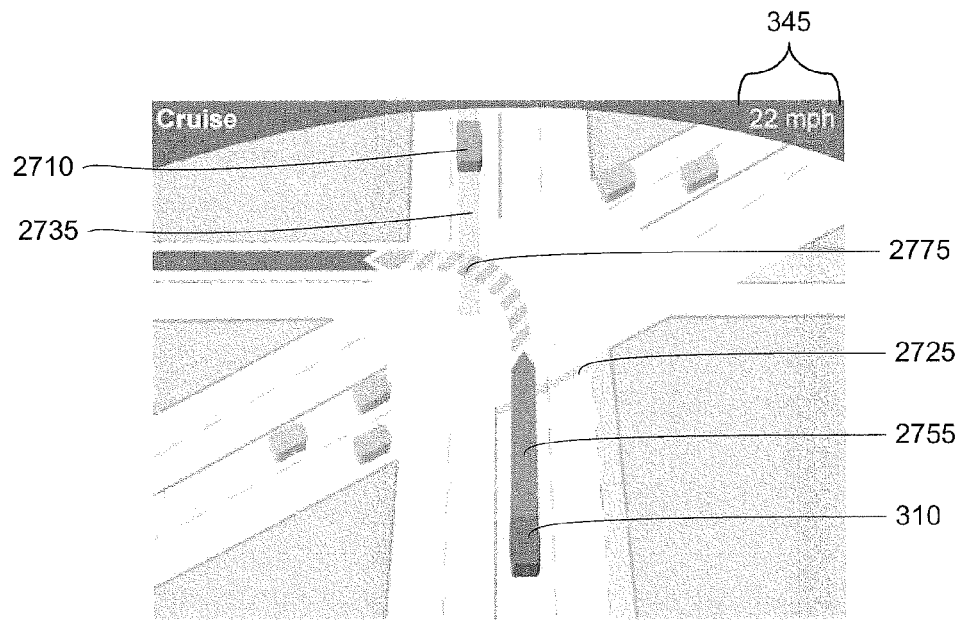
FIG. 27 is an exemplary screen shot in accordance with an aspect of the invention.

Computer 110 may also display a headroom zone in front of boxes indicating other vehicles in order to inform the passenger that the computer will not move into this zone. As shown in FIG. 27, vehicle 101 is approaching an intersection, as indicated by bar 2725. The shape of path 2755 indicates that computer 110 will make vehicle 101 perform a left turn. Striped section 2775 of path 2755 indicates that once vehicle 101 reaches the intersection, computer 110 will wait until it is safe to make the left turn. In the example, computer 110 has identified a vehicle, displayed as box 2710 which will pass through path 2755. Computer 110 may display a headroom zone 2735 which computer 110 will avoid in order to move through the intersection or make the left hand turn safely.

Figure 28:
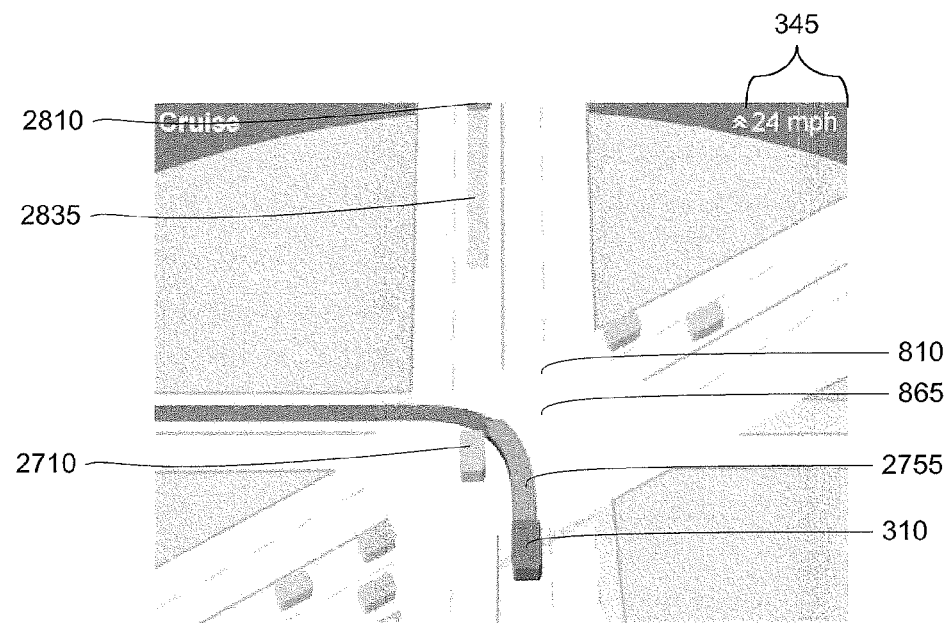
FIG. 28 is an exemplary screen shot in accordance with an aspect of the invention.
Figure 29:
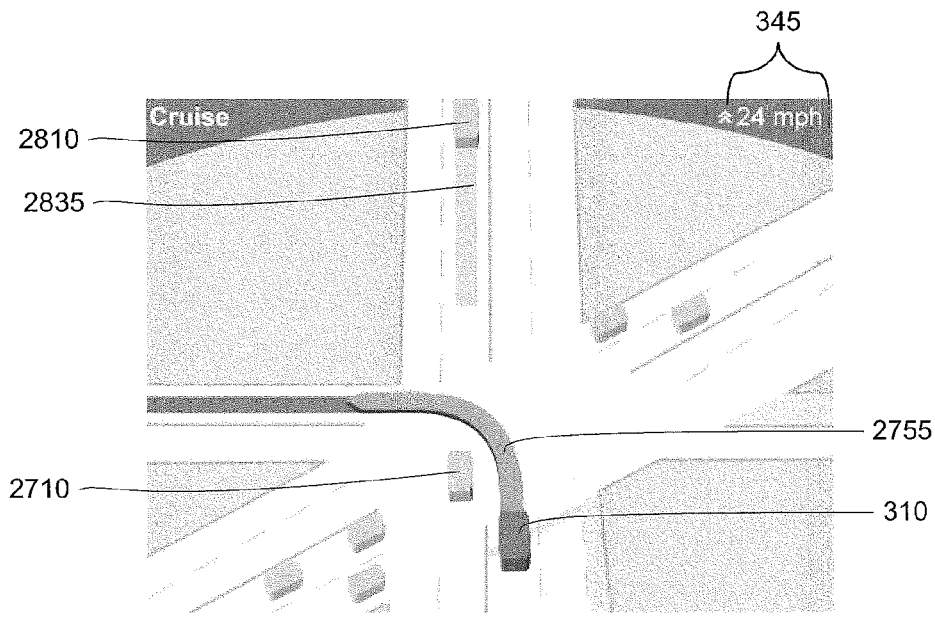
FIG. 29 is an exemplary screen shot in accordance with an aspect of the invention.

As shown in FIG. 28, box 2710 has moved closer to box 310, and striped section 2775 is no longer displayed as computer 110 has determined that it is now safe to make the left turn. Thus computer 110 may begin to increase the speed of vehicle 101. In addition, as box 310 is no longer likely to move into the headroom zone of box 2710, computer 110 may no longer display headroom zone 2735. In the example, a new vehicle, displayed as box 2810, is approaching path 2755. Computer 110 may also display a headroom zone 2835 in order to indicate to the passenger that the computer will not move vehicle 101 into this zone. Again, if computer 110 determines that it is safe to make the turn despite the continued approach of the headroom zone 2835 of box 2810, shown in FIG. 29, computer 110 will direct vehicle 101 to make the left turn.

Figure 30:
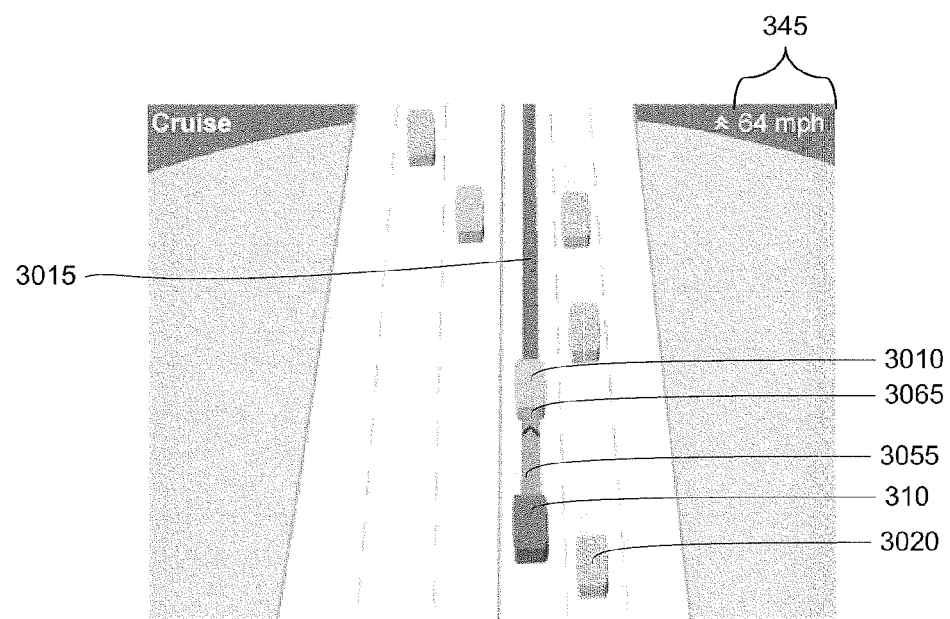
FIG. 30 is an exemplary screen shot in accordance with an aspect of the invention.
Figure 31:
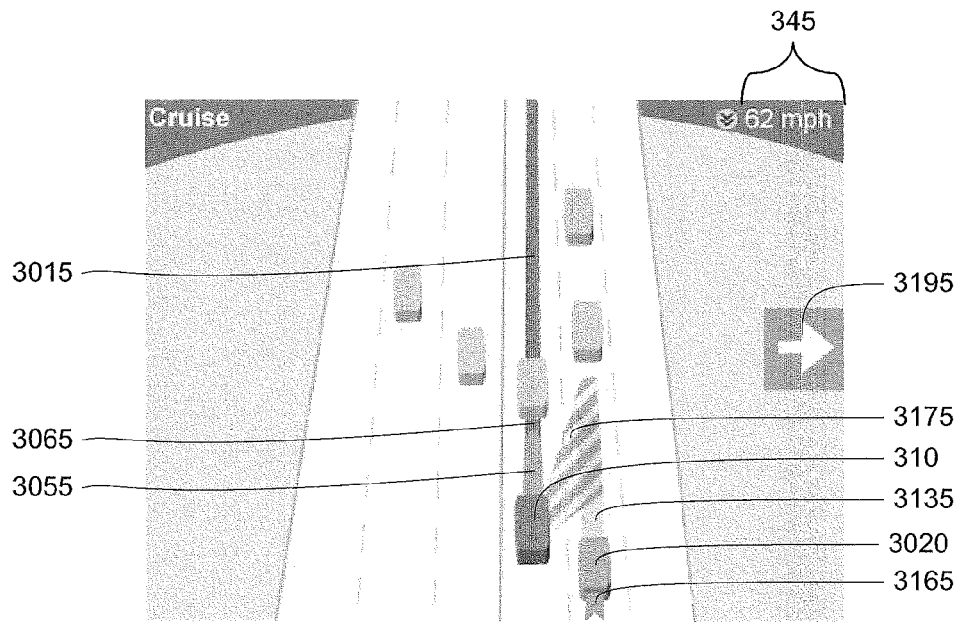
FIG. 31 is an exemplary screen shot in accordance with an aspect of the invention.
Figure 32:
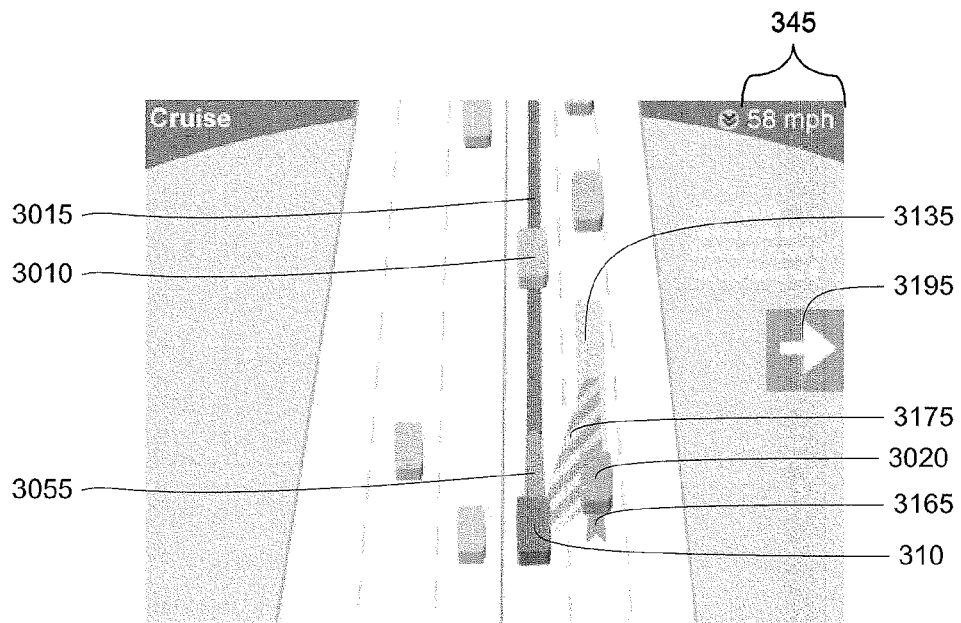
FIG. 32 is an exemplary screen shot in accordance with an aspect of the invention.
Figure 33:
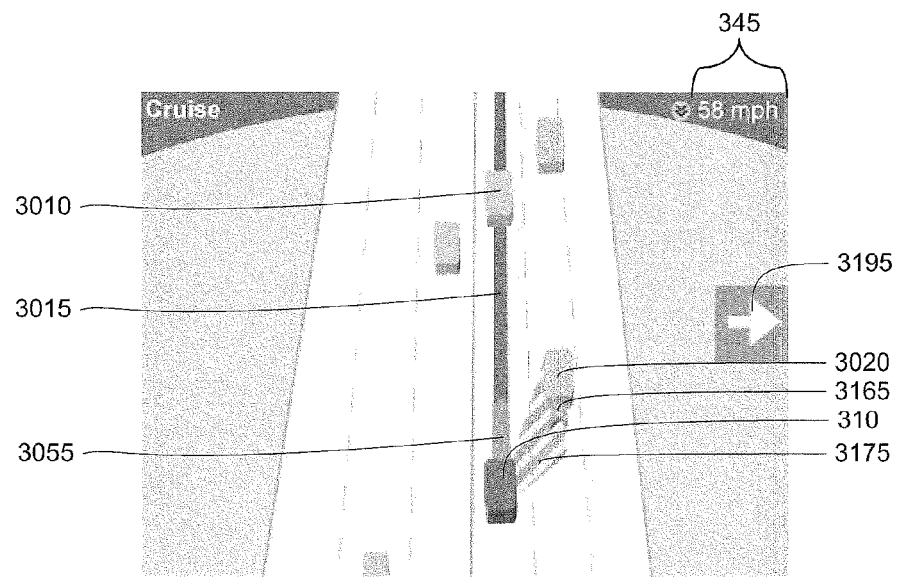
FIG. 33 is an exemplary screen shot in accordance with an aspect of the invention.

Computer 110 may also use the display to indicate to the passenger that the vehicle 101 will be changing lanes. As shown in FIG. 30, vehicle 101 is moving along route 3015 behind a second vehicle, displayed as box 3010. The positions of path 3055 and tail 3065 may indicate that vehicle 101 is maintaining a safe following distance along route 3015 behind the second vehicle. If computer 110 determines a change of lanes is appropriate as shown in FIG. 31, the computer may display a turn signal icon 3195 which indicates that the vehicle is going to move to the lane to the right of box 310, for example if route 3015 requires the vehicle to take an exit or make a turn. In addition, computer 110 may display a turning zone 3175, similar to a path with stripes, to indicate that computer 110 is waiting until it is safe to move into the zone. In the example, computer 110 is waiting because the headroom zone 3135 of a third vehicle, displayed as box 3020, is within the turning zone 3175. If computer has determined that vehicle 101 will follow behind the third vehicle, computer 110 may also display a tail 3165 behind box 3020. As shown in FIG. 32, as vehicle 101 begins to slow down and move towards the tail 3165, computer 110 may begin to fade the display of headroom zone 3135 until, for example, the headroom zone is no longer useful or needed as shown in FIG. 33.

Figure 34:
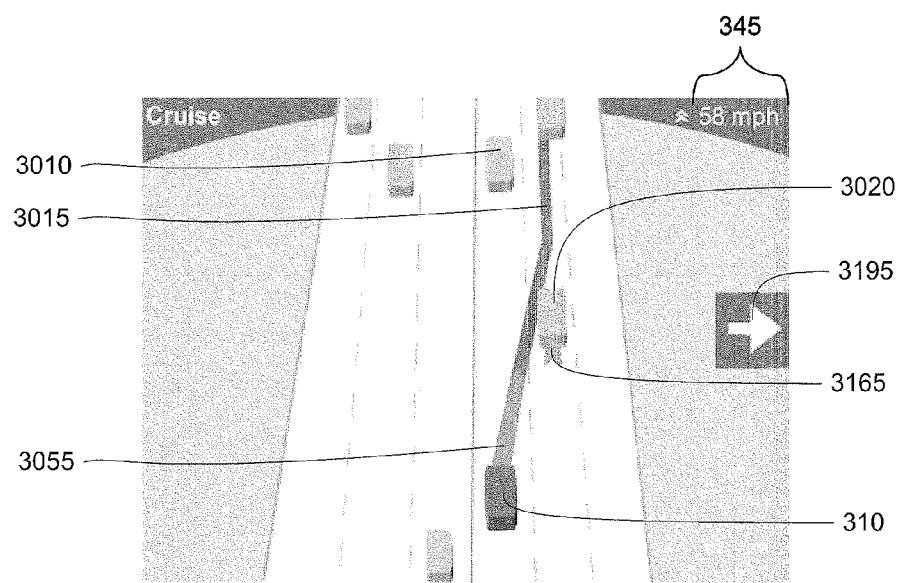
FIG. 34 is an exemplary screen shot in accordance with an aspect of the invention.
Figure 35:
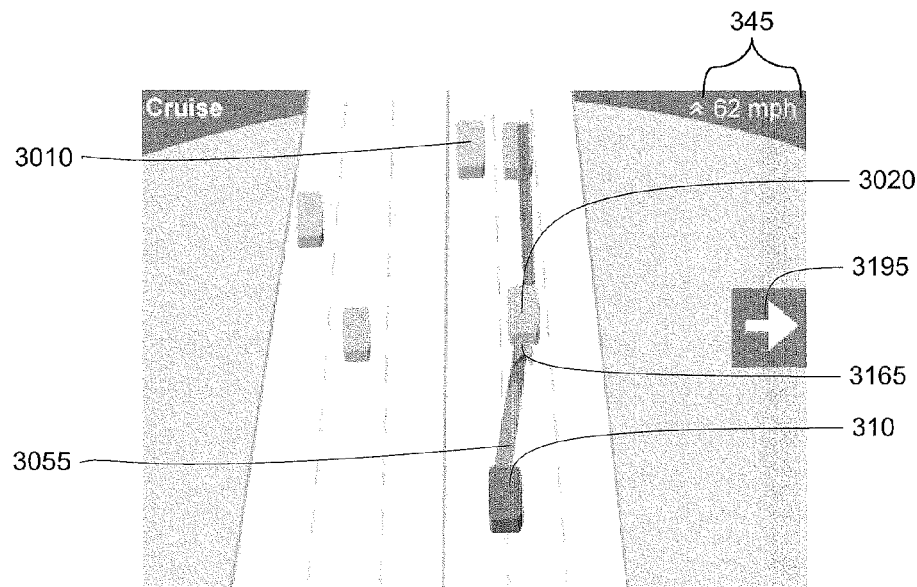
FIG. 35 is an exemplary screen shot in accordance with an aspect of the invention.
Figure 36:
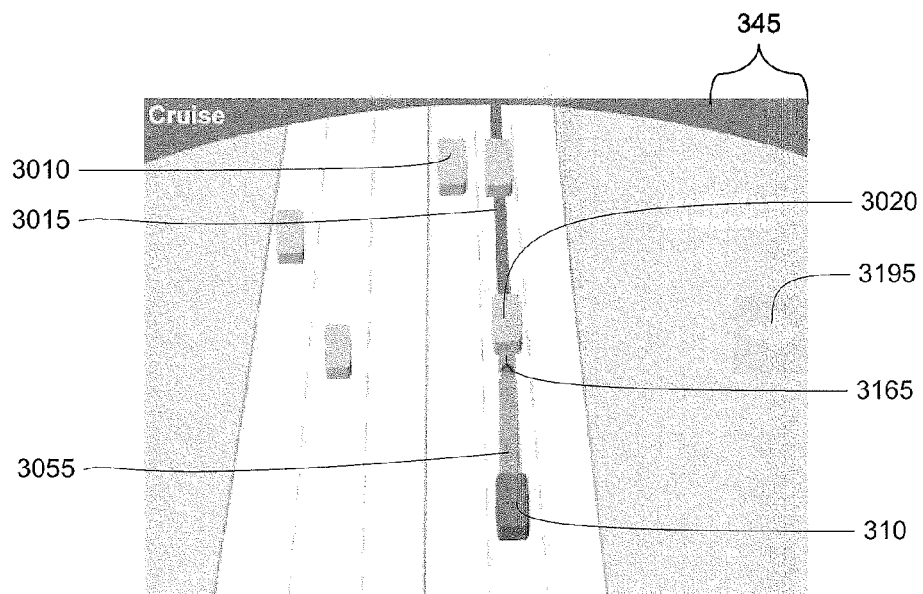
FIG. 36 is an exemplary screen shot in accordance with an aspect of the invention.

Similarly, computer may also indicate to the passenger that the vehicle is ready to turn. Once vehicle 101 moves behind the third vehicle, and box 3020 is no longer within the turning zone 3175, computer 110 may no longer display the turning zone 3175, as shown in FIG. 34. In addition, route 3015 may be repositioned to show that vehicle 101 is going to move along the roadway in the lane to the right of box 310. As shown in FIG. 35, computer 110 may begin to move vehicle 101 into the lane to the right, and on the display move the end of complementary ends of path 3055 tail 3165 of box 3020 towards one another as described above. As vehicle 101 has not yet completely changed lanes, computer 110 may continue to display turn signal icon 3195. Then, as shown in FIG. 36, when vehicle 101 moves completely into the lane, computer 110 may fade or remove turn signal icon 3195.

Figure 37:
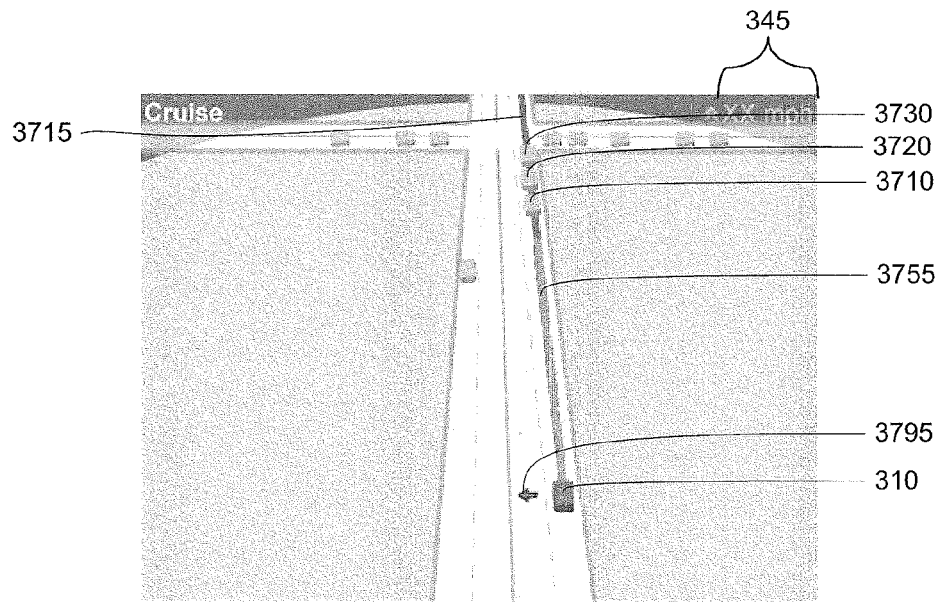
FIG. 37 is an exemplary screen shot in accordance with an aspect of the invention.
Figure 38:
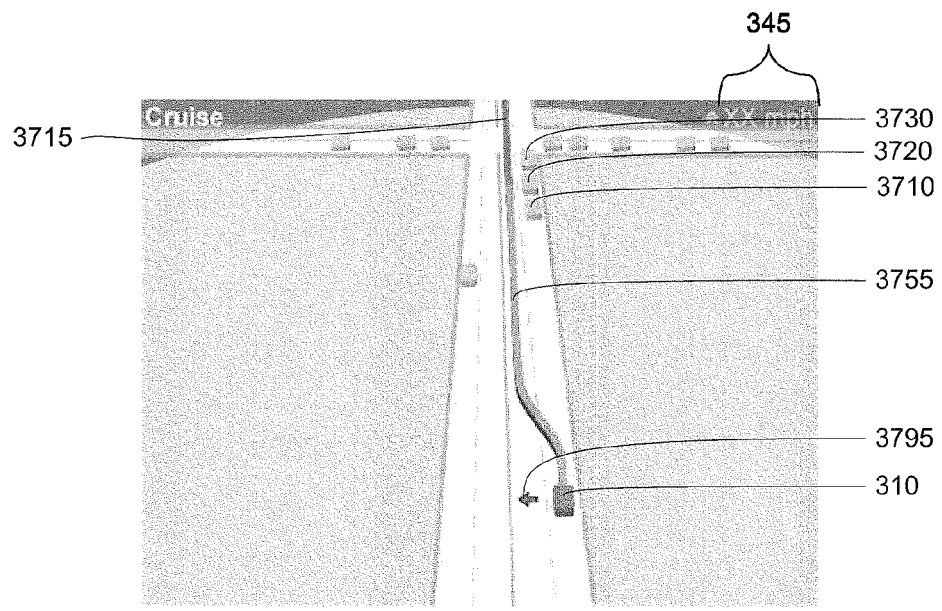
FIG. 38 is an exemplary screen shot in accordance with an aspect of the invention.

Computer 110 may display turning information in various additional ways. For example, as shown in FIG. 37, computer 110 may determine that vehicle must move one lane to the left in order to avoid the vehicles displayed as 3710, 3720, and 3730. Computer 110 may display a small icon 3795 close to box 310 indicating that computer 110 is planning to move vehicle 101 one lane to the left. In addition, as shown in FIG.

38, computer 110 may also move path 3755 and route 3715 into the left lane to indicate the future path of vehicle 101.

Figure 39:
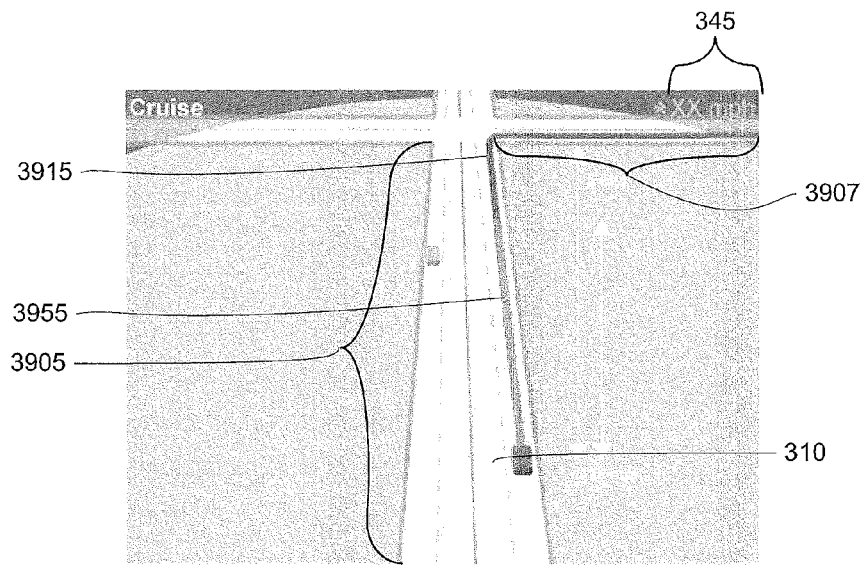
FIG. 39 is an exemplary screen shot in accordance with an aspect of the invention.

Computer 110 may also display information such as an estimated time to a particular location. For example, as shown in FIG. 39, Vehicle 101 is moving along roadway 3905, and route 3915 requires that the vehicle turn at the intersection with roadway 3907. Computer 110 may display the estimated time for vehicle 101 to reach a relevant location, for example, the end of path 3955, the intersection of roadways 3905 and 3907, or the next turn of route 3915.

Figure 40:
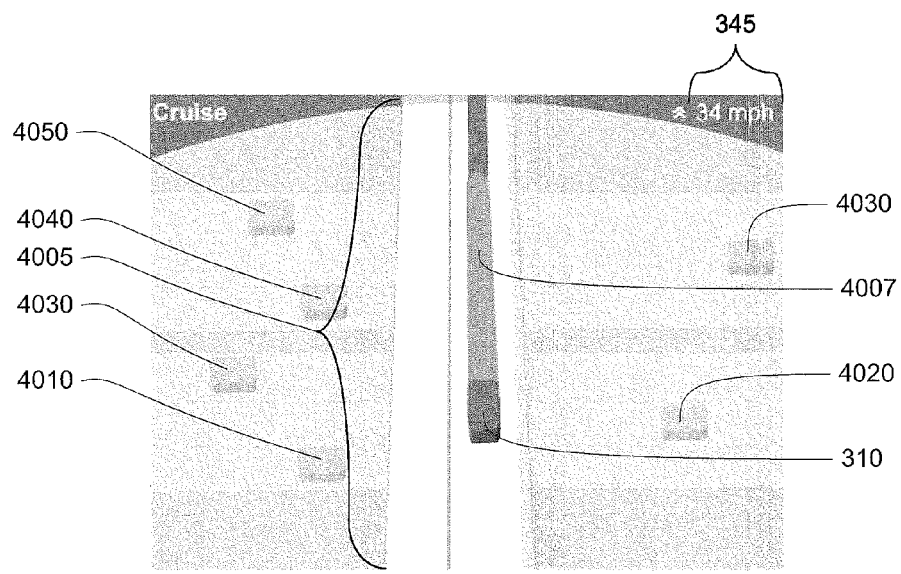
FIG. 40 is an exemplary screen shot in accordance with an aspect of the invention.

Computer 110 may use the display to convey other relevant information to the passenger. For example, as shown in FIG. 40, vehicle 101 is moving along an overpass. Computer 110 may display box 310 moving along a roadway 4005 over roadway 4007. Computer 110 may display the vehicles as well as the roadway underneath vehicle 101 in such a way as to indicate that these objects are below vehicle 101. For example, roadway 4007 and the vehicles moving along the roadway, for example boxes 4010 and 4020, may be displayed as faded or darker to indicate to the passenger that these objects are below vehicle 101 or are simply less relevant for some other reason.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

It will be further understood that the sample values, icons, types and configurations of data described and shown in the figures are for the purposes of illustration only. In that regard, systems and methods in accordance with aspects of the invention may include different physical attributes, data values, data types and configurations, and may be provided and received at different times and by different entities (e.g., some values may be pre-suggested or provided from different sources).

The invention claimed is:

1. A method comprising:
receiving destination information from a user input device about a destination for a vehicle;
receiving location information of the vehicle from a geographic position component;
identifying a route to the destination based on the received location information;
accessing stored map information;
displaying on a display device of the vehicle the stored map information based on the received location information;
displaying along with the stored map information a path of the vehicle based on the route;
determining, by a processor of the vehicle, that in order to follow the route safely, the vehicle must wait before proceeding along the route; and
when the processor determines that the vehicle must wait, displaying a portion of the path in a first way to indicate to a user that the vehicle is waiting.

2. The method of claim 1, further comprising:
determining by the processor that the vehicle no longer needs to wait; and
when it is determined that the vehicle no longer needs to wait, displaying on the display device the portion of path in a second way, different from the first way, to indicate to the user that the vehicle is no longer waiting.

3. The method of claim 2, wherein the second way includes displaying the portion of the path as a solid line.

4. The method of claim 1, further comprising, when displaying the portion of the path in the first way, displaying on the display device text indicating that the vehicle is waiting.

5. The method of claim 1, wherein the first way includes displaying portion of the path as striped.

6. The method of claim 1, wherein determining by the processor that the vehicle must wait includes:
receiving data from an object detection apparatus indicating the object in a roadway; and
determining that in order to follow the route safely, the vehicle must wait for an action to be completed by the object.

7. The method of claim 6, wherein the action includes the object moving through an intersection.

8. The method of claim 6, wherein the action includes the object making a turn.

9. The method of claim 6, wherein the action includes the object passing the vehicle.

10. The method of claim 1, further comprising, when displaying the portion of the path in the first way, displaying on the display device a ticking clock indicating that the vehicle is waiting.

11. A device comprising:
memory storing map information;
a display device; and
a processor configured to:
access the memory;
receive destination information from a user input device about a destination for a vehicle;
receive location information of the vehicle from a geographic position component;
identify a route to the destination based on the received location information;
display on the display the stored map information based on the received location information;
display along with the stored map information a path of the vehicle based on the route;
determine that in order to follow the route safely, the vehicle must wait before proceeding along the route;
when the processor determines that the vehicle must wait, display on the display device a portion of the path in a first way order to indicate to a user that the vehicle is waiting.

12. The device of claim 1, wherein the processor is further configured to:
determine by the processor that the vehicle no longer needs to wait; and
when it is determined that the vehicle no longer needs to wait, display the portion of path in a second way, different from the first way, to indicate to the user that the vehicle is no longer waiting.

13. The device of claim 12, wherein the second way includes displaying the portion of the path as a solid line.

14. The device of claim 1, wherein the processor is further configured to, when displaying the portion of the path in the first way, display on the display device text indicating that the vehicle is waiting.

15. The device of claim 11, wherein the first way includes displaying the portion of the path as striped.

16. The device of claim 1, wherein the processor is further configured to determine that the vehicle must wait by:
receiving data from an object detection apparatus indicating an object in a roadway; and determining that in order to follow the route safely, the vehicle must wait for an action to be completed by the object.

17. The device of claim 16, wherein the action includes the object moving through an intersection.

18. The device of claim 16, wherein the action includes the object making a turn.

19. The device of claim 16, wherein the action includes the object passing the vehicle.

20. The device of claim 11, wherein the processor is further configured to, when displaying the portion of the path in the first way, display on the display device a ticking clock indicating that the vehicle is waiting.

21. A non-transitory, tangible computer-readable storage medium on which computer readable instructions of a program are stored, the instructions, when executed by a processor, cause the processor to perform a method, the method comprising:

receiving destination information from a user input device about a destination for a vehicle;

receiving location information of the vehicle from a geographic position component;

identifying a route to the destination based on the received location information;

accessing stored map information;

displaying on a display device of the vehicle the stored map information based on the received location information;

displaying along with the stored map information a path of the vehicle based on the route;

determining that in order to follow the route safely, the vehicle must wait before proceeding along the route; and when the processor determines that the vehicle must wait, displaying a portion of the path in a first way to indicate to a user that the vehicle is waiting.

* * * * *